United States Patent
Vaags

(10) Patent No.: US 6,779,486 B2
(45) Date of Patent: Aug. 24, 2004

(54) AUTOMATIC ANIMAL FEEDER

(75) Inventor: David W. Vaags, Abbotsford (CA)

(73) Assignee: Feedlogic Systems Inc., Abbotsford (CA)

( * ) Notice: Subject to any disclaimer, the term of this patent is extended or adjusted under 35 U.S.C. 154(b) by 0 days.

(21) Appl. No.: 09/977,974

(22) Filed: Oct. 17, 2001

(65) Prior Publication Data

US 2003/0070622 A1 Apr. 17, 2003

(51) Int. Cl.$^7$ ............................................. A01K 5/02
(52) U.S. Cl. ............................... 119/51.11; 119/51.02; 119/57.7; 119/57.92
(58) Field of Search .................... 119/51.01, 51.02, 119/51.04, 52.1, 53, 56.1, 56.2, 57, 57.1, 57.7, 57.92, 51.11; 366/131, 132, 134, 140–142, 152.1, 156.2, 160.1; 222/142, 64

(56) References Cited

U.S. PATENT DOCUMENTS

| | | | | |
|---|---|---|---|---|
| 2,538,413 A | * | 1/1951 | Chard ......................... | 222/650 |
| 2,851,553 A | * | 9/1958 | Grostick .................. | 200/61.21 |
| 3,119,526 A | * | 1/1964 | Sutton ......................... | 222/56 |
| 3,131,911 A | * | 5/1964 | Geerlings ................... | 366/142 |
| 3,422,799 A | * | 1/1969 | Ruffing ...................... | 119/56.2 |
| 3,550,812 A | * | 12/1970 | Brown ........................ | 222/643 |
| 3,587,529 A | | 6/1971 | Wienert et al. ........... | 119/51.5 |
| 3,693,593 A | * | 9/1972 | Ackermann et al. ....... | 119/57.4 |
| 3,904,082 A | * | 9/1975 | Hostetler ..................... | 222/650 |
| 4,561,781 A | * | 12/1985 | Seymour .................. | 241/101.8 |
| 4,682,737 A | * | 7/1987 | Ono ............................. | 116/229 |
| 4,981,107 A | | 1/1991 | Beaudoin et al. | |
| 5,069,165 A | | 12/1991 | Rousseau | |
| 5,148,943 A | * | 9/1992 | Moller .......................... | 222/1 |
| 5,299,529 A | * | 4/1994 | Ramirez .................. | 119/51.11 |
| 5,423,455 A | * | 6/1995 | Ricciardi et al. .............. | 222/1 |
| 5,423,456 A | * | 6/1995 | Arendonk et al. ............ | 222/54 |
| 5,718,188 A | | 2/1998 | Erickson | |
| 5,913,602 A | * | 6/1999 | Steele ......................... | 366/132 |
| 6,371,047 B1 | * | 4/2002 | van den Berg .......... | 119/51.02 |

FOREIGN PATENT DOCUMENTS

| | | | |
|---|---|---|---|
| DE | 2855000 | 6/1980 | |
| DE | 2855000.7-23 | 6/1980 | ............ A01K/5/02 |
| FR | 2495892 | 12/1980 | ............ A01K/5/00 |
| FR | 2495892 A | 6/1982 | |
| WO | WO8809119 A1 | * 12/1988 | .......... A01K/05/02 |

* cited by examiner

Primary Examiner—Charles T. Jordan
Assistant Examiner—T. Nguyen
(74) Attorney, Agent, or Firm—Oyen Wiggs Green & Mutala

(57) ABSTRACT

An animal feeder system comprises a mobile feeder suspended from an overhead track. The track can conveniently be made from pipe bent into a desired configuration. The mobile feeder has an on-board computer controller and a computer-controlled motor which can drive the mobile feeder to feed drops located along the track. The mobile feeder has a number of feed compartments which each hold a feed ingredient. The ingredients are dispensed simultaneously by variable speed augers. A customized blend of feed ingredients is dispensed at each feed drop. The animal feeder system can automatically track the amount of feed consumed at each feed drop and can run unattended. Applications include feeding swine, horses, chickens, fish, cattle and other animals which are reared in captivity.

34 Claims, 21 Drawing Sheets

AUTOMATIC ANIMAL FEEDER

TECHNICAL FIELD

This invention relates to a system for automatically feeding individual animals or groups of animals. The invention has application in feeding swine, cattle, chickens, fish and other animals being reared in confinement.

BACKGROUND

Feeding animals is a science. Research has shown that advanced animal feeding methods such as split sex feeding, phase feeding and blended feeding can help to optimize animal growth, reduce wastage of feed, and lower manure output. In such systems animals are provided with a blend of feed ingredients which is tailored to the animals' age, sex and weight. In general, younger smaller animals require higher energy feed while older larger animals require lower energy feed. The animals should receive required amounts of various nutrients without receiving more than their requirements. As the animals mature the ideal blend of ingredients changes. Implementing these feeding systems has proven to be difficult with the current state of the art in animal feeding apparatus. One obstacle to the successful implementation of advanced feeding strategies is that most such strategies require knowledge of the actual feed intake of the animals being fed. Most existing systems are incapable of obtaining this information in a useful manner. Knowing how much an animal eats each day provides the information needed to set optimum levels of feed components such as amino acids and other nutrients.

In modern farming operations feeding animals is a significant chore. Various automatic animal feeding systems exist. In general, it is not readily practical to use such systems to make a custom mix of feed for each animal or to feed each animal individually. It is often not even practical to make customized feed mixtures for many different groups of animals.

Erickson, U.S. Pat. No. 5,718,188 discloses a computer controlled hog feed management system. Two or more feed rations are blended in a blending hopper and then delivered by an auger system to one of a number of feed drops. Each feed drop has a pneumatic valve to open and close the drop. In the Erickson system, the amount of feed that each feed drop will accept must be known in advance. The feed is first blended and then dispensed. To deliver a different feed mix at each feed drop requires running the auger system at each drop until it is empty of feed. A problem with systems of this nature is that feeders can tend to plug up. This prevents feed from being delivered to its intended drop and can result in feed being delivered to a drop for which it was not intended. Further, it is difficult and in some cases impossible to reasonably accurately measure feed intake with such a system.

Rosseau, U.S. Pat. No. 5,069,165 discloses a livestock feeder system having a mobile feeder unit. The feeder unit contains a number of compartments which can each hold a different animal feed ingredient. Auger screws discharge feed from each compartment onto a discharge conveyor. The feeder unit includes a computer control which can cause the feeder unit to move along an overhead guide track to a desired location and to discharge feed at that location. While feed is being dispensed, the discharge conveyor is operated continuously and the augers for various feed ingredients are operated for different lengths of time selected to deliver a desired amount of each ingredient at the location.

Beaudoin et al., U.S. Pat. No. 4,981,107 discloses a feed system similar to that of Rosseau. The Beaudoin et al. system includes a scale associated with a discharge conveyor. A desired amount of each of two individual feed ingredients can be weighed one-at-a time onto the conveyor. The feed on the conveyor can then be dispensed by operating the conveyor.

A disadvantage of the Rosseau and Beaudion et al. systems is that the feed delivered by these systems is not fully blended. Rather, the feed is delivered as a pile of partially mixed feed ingredients. Further, these systems do not provide any convenient mechanism for recording and reacting to changes in feed intake.

There remains a need for a system for feeding animals, for example, swine, cattle, horses, chickens, or fish, which is easy to operate and is capable of providing customized feed rations to individual animals or groups of animals. There is a particular need for such systems which can accurately measure the feed dispensed without wasting or misplacing feed. There is also a particular need for such systems which are capable of monitoring the feed intake of the animals being fed.

SUMMARY OF THE INVENTION

This invention provides methods and apparatus for feeding animals. The apparatus permits specified blends of feed ingredients to be automatically dispensed at each of a number of feed drops. The invention may be implemented in a manner which minimizes wastage of feed and permits feed to be accurately measured.

One aspect of the invention provides an animal feeder system which comprises a mobile feeder. The mobile feeder comprises at least first and second feed compartments and may have more feed compartments. Each feed compartment is capable of holding a feed ingredient. The mobile feeder has a discharge chute. First and second dispensing devices respectively associated with the first and second feed compartments are each adapted to deliver a feed ingredient from the associated feed compartment to the discharge chute. A variable speed first motor is connected to drive the first dispensing device. A second motor connected to drive the second dispensing device. The mobile feeder comprises a controller, which preferably comprises a programmed computer equipped with suitable interfaces but may comprise control circuitry. The controller is connected to control the first and second motors. The controller is adapted to cause animal feed comprising a selected blend of feed ingredients from the first and second feed compartments to be discharged from the discharge chute by adjusting relative speeds of the first and second motors. The feed ingredients are mixed together in the discharge chute. Preferably each of the first and second motors is a variable speed motor. The motors preferably comprise stepper motors or servo motors which can be accurately controlled by the controller.

In preferred embodiments of the invention the feeder system comprises a detector which detects when a feed drop is full. The detector may comprise a sensor, such as a switch, which generates a signal in response to feed backing up into the discharge chute.

A further aspect of the invention provides an animal feeder system comprising: a feed compartment; a discharge chute; a dispensing device associated with the feed compartment and adapted to deliver a feed ingredient from the feed compartment to the discharge chute; a motor connected to drive the dispensing device; a full switch located to detect when a feed drop being filled by the animal feeder system is full; and, a controller connected to operate the motor until the full switch indicates that the feed drop is full.

Yet another aspect of the invention provides a method for delivering a variable blend of animal feed. The method comprises providing a mobile feeder comprising a plurality of feed compartments each containing a different one of a plurality of animal feed ingredients; moving the mobile feeder to a dispensing location; establishing a ratio of two or more specific animal feed ingredients to be dispensed at the location; simultaneously dispensing the two or more specific feed ingredients by operating dispensing devices associated with the plurality of feed containers at controlled rates selected to correspond with the ratio of the two or more specific feed ingredients to be dispensed; and substantially simultaneously stopping the operation of the dispensing devices. The operation of the dispensing devices may be stopped when a desired quantity of feed has been dispensed or when a sensor determines that the feed drop being serviced is full.

Further features and advantages of the invention are described below.

BRIEF DESCRIPTION OF DRAWINGS

In drawings which illustrate a currently preferred, but non-limiting embodiment of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This invention provides an animal feeder system which includes a mobile feeder unit having several feed compartments. Each compartment may contain a different feed ration. The feeder unit moves to each of a number of drop locations under automatic control. At each drop location the feeder unit dispenses a selected blend of feed. The blend comprises a mixture of two or more different feed rations. In general, a different blend of rations may be delivered at each drop location. The animal feeder system may be set up to deliver a blend comprising 100% of one feed ration and 0% of a second feed ration; 0% of the one feed ration and 100% of the second feed ration or any blend in between. In embodiments of the invention capable of dispensing blends of three or more feed rations, the amount of any one of the feed rations of the blend can preferably be adjusted in the range of 0% to 100%.

Figure 1A:
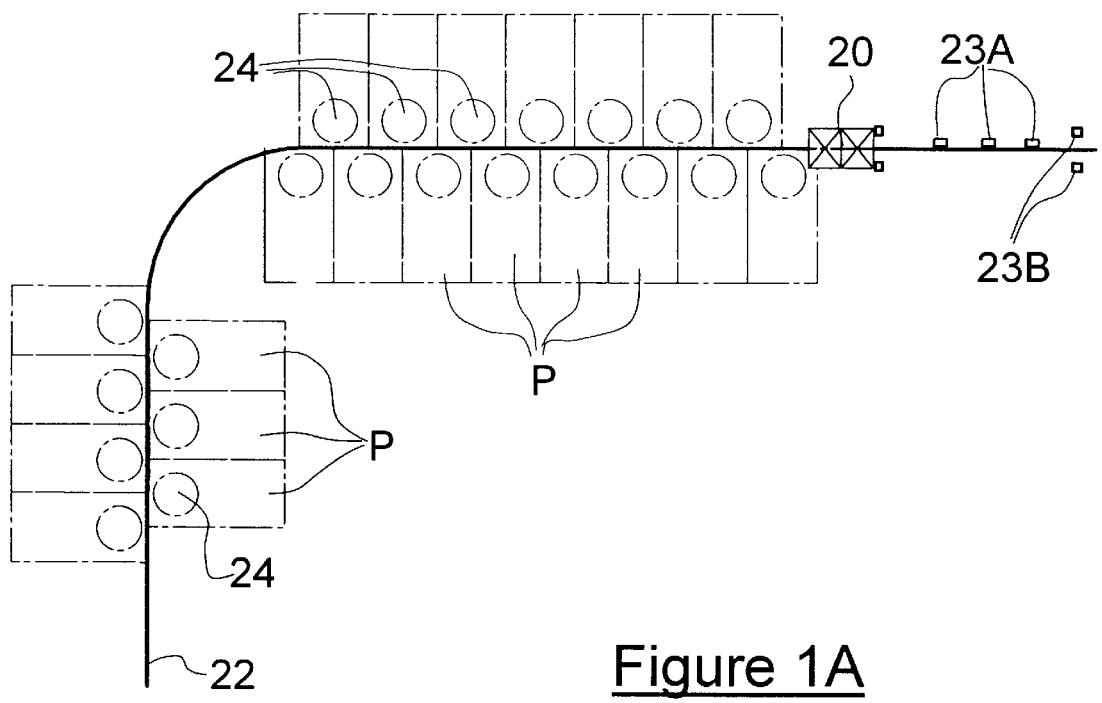
FIGS. 1A and 1B are plan views of a barn equipped with animal feeding systems according to the invention.
Figure 2:
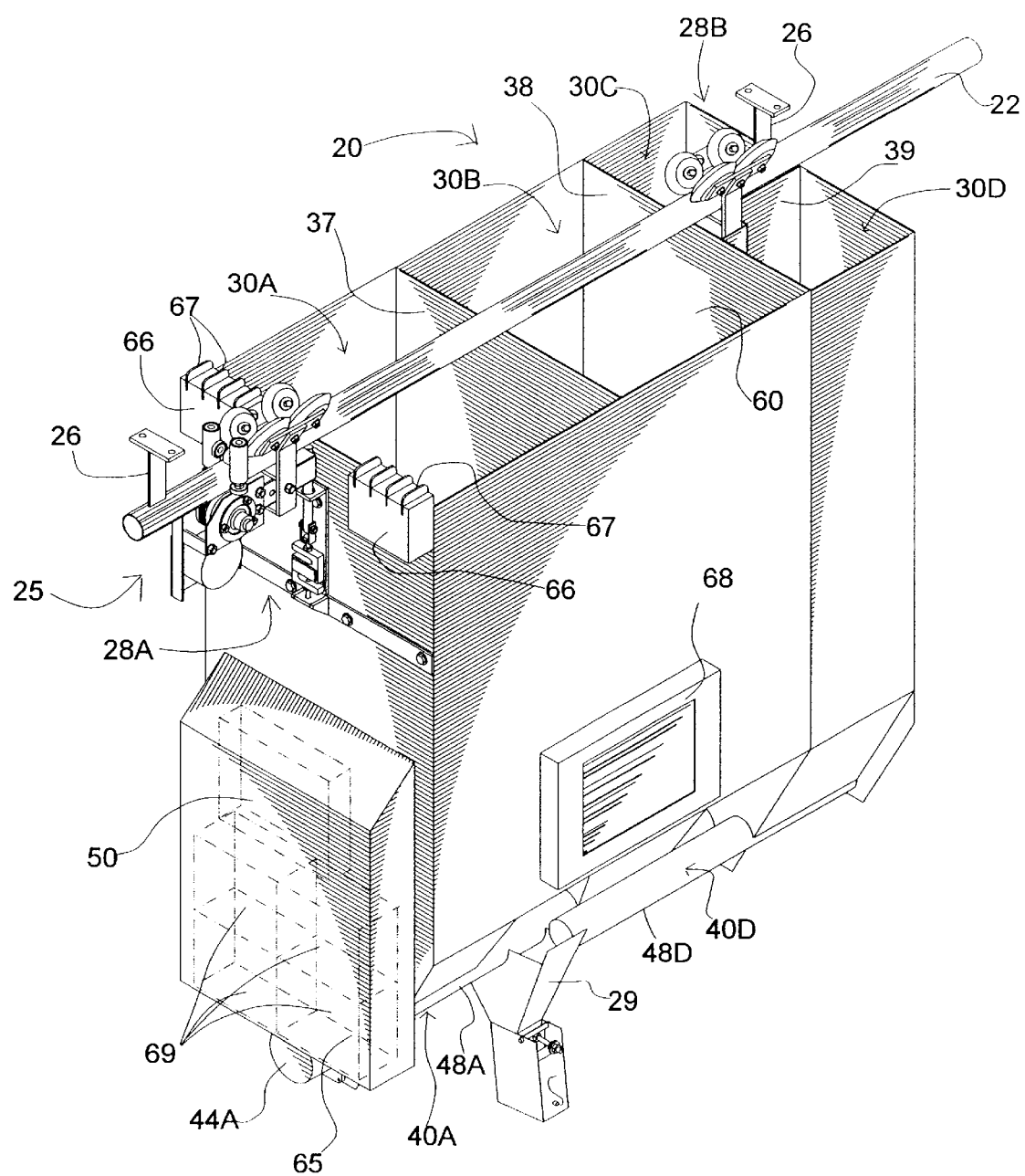
FIG. 2 is an isometric view of a section of an overhead track and a mobile feeder.
Figure 3:
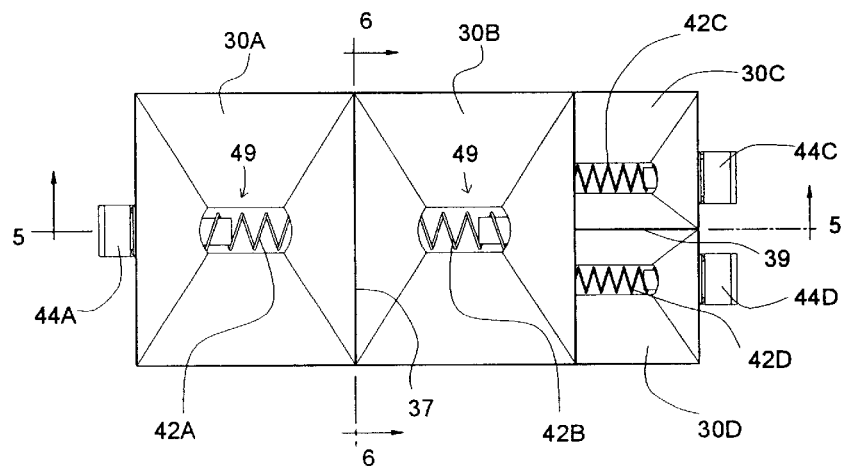
FIG. 3 is a top sectional view of the mobile feeder of FIG. 2 in the line 3—3 of FIG. 5A.

FIG. 2 shows an animal feeder system according to a currently preferred embodiment of the invention. The feeder system comprises a mobile feeder 20. The feeder system also comprises a guide means for guiding mobile feeder 20 to a number of feed drops and a drive means 25 for moving mobile feeder 20 along the guide means. In the illustrated embodiment, mobile feeder 20 is suspended from, and movable along, an overhead track 22. Track 22 preferably comprises a round pipe suspended from the ceiling by metal supports 26 connected at spaced-apart intervals along the length of track 22, FIG. 1A shows a plan view of a simple layout in which track 22 extends along a generally L-shaped path in a barn having a number of pens P. The layout of track 22 can be varied to suit the facility in which the feeder system is being installed.

A number of drop locations 24 are located along track 22. One or more filling stations 23A and one or more battery charging stations 23B are located along the path defined by track 22. Mobile feeder 20 can be refilled with feed rations at filling stations 23A as described below.

Mobile feeder 20 is preferably powered by on-board rechargeable storage batteries 69. Batteries 69 may comprise lead-acid batteries. Batteries 69 may be located in a compartment 65. Mobile feeder 20 has a block 66 bearing a number of electrical contacts 67 for recharging batteries 69 (see FIGS. 4, 5, and 8). Where there are multiple batteries 69 then preferably a separate one of contacts 67 is provided for each battery. This permits the charging current for each battery 69 to be regulated separately. Batteries 69 are charged while mobile feeder 20 is at a battery charging station 23B.

Mobile feeder 20 comprises a plurality of feed compartments. The embodiment illustrated in FIGS. 2–8 has four feed compartments 30A, 30B, 30C, and 30D (generally compartments 30). Each feed compartment 30 can accommodate a different feed ingredient. Typically each feed compartment 30 will contain a pre-ground and pre-mixed ration. Feed compartments 30 may be arranged in any suitable physical arrangement. The embodiment illustrated in FIGS. 2–8 has two larger feed compartments 30A and 30B positioned next to each other in a longitudinal fashion and separated by a transverse dividing wall 37. Two smaller feed compartments 30C and 30D are located at one end of mobile feeder 20. Compartments 30C and 30D are positioned next to each other and are separated by a longitudinal wall 39. Each of feed compartments 30C and 30D extends half the width of mobile feeder 20 and is separated from feed compartment 30B by a transverse wall 38.

A dispensing means 40 (the dispensing means are individually labeled 40A, 40B, 40C, and 40D) is respectively associated with each of feed compartments 30A through 30D. Each dispensing means 40 comprises a device which controllably conveys a feed ingredient from its associated feed container to a common discharge location at chute 29. Where a blend of more than one feed ingredient is being dispensed, the dispensing means for the different ingredients in the blend are operated simultaneously. The feed ingredients mix with one another in discharge chute 29 so that the feed deposited at each drop location 24 is blended.

In the illustrated embodiment, each feed compartment 30 is configured in the form of a hopper and has a tapered bottom end. The illustrated dispensing means 40 each comprise an auger 42 driven by a motor 44. Augers 42, are each disposed within a pipe 48 which extends between one of the feed compartments and discharge chute 29. Pipes 48A through 48D extend respectively under feed compartments 30A through 30D. Feed ingredients from the feed compartments 30 can drop into the corresponding pipes 48 through apertures 49.

Motors 44 (which are individually labeled 44A, 44B, 44C, and 44D) respectively operate augers 42 (which are individually labeled 42A through 42D). Motors 44 are variable speed motors so that the rate at which each feed ingredient is delivered to chute 29 can be varied. Motors 44 are preferably motors which can be directly computer-controlled. For example, motors 44 may be stepper motors or servo motors.

Figure 9:
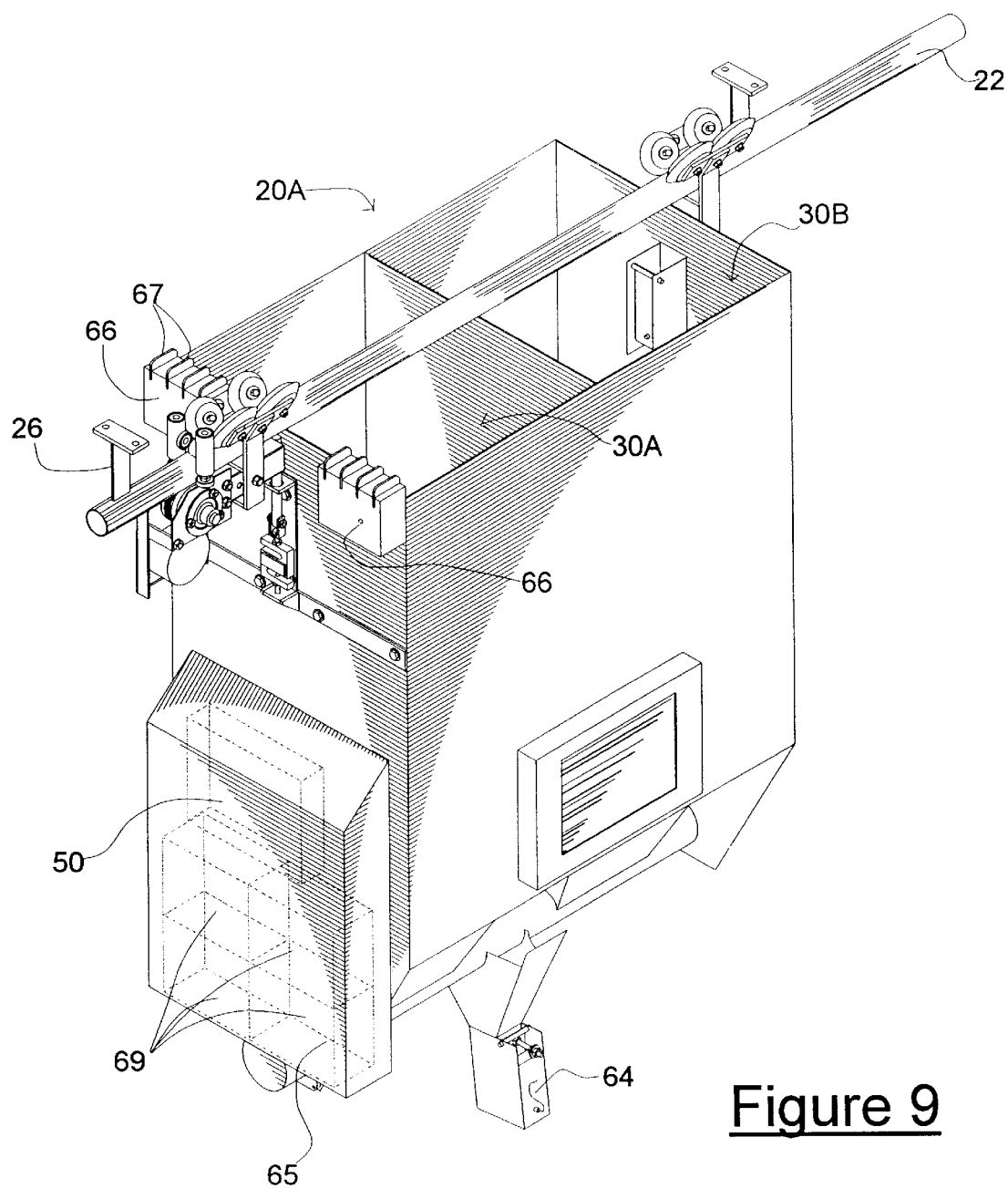
FIG. 9 is an isometric view of a mobile feeder according to an alternative embodiment of the invention showing a mobile feeder having two feed compartments.

The number of feed compartments in mobile feeder 20 can be varied as long as there are at least two (i.e. a plurality) of feed compartments. For example, FIG. 9 shows a feeder unit 20A according to an alternative embodiment of the invention in which the feeder unit comprises only two feed compartments 30A and 30B. Alternative embodiments of the invention comprising feeder units having more than four feed compartments are also possible.

Figure 8:
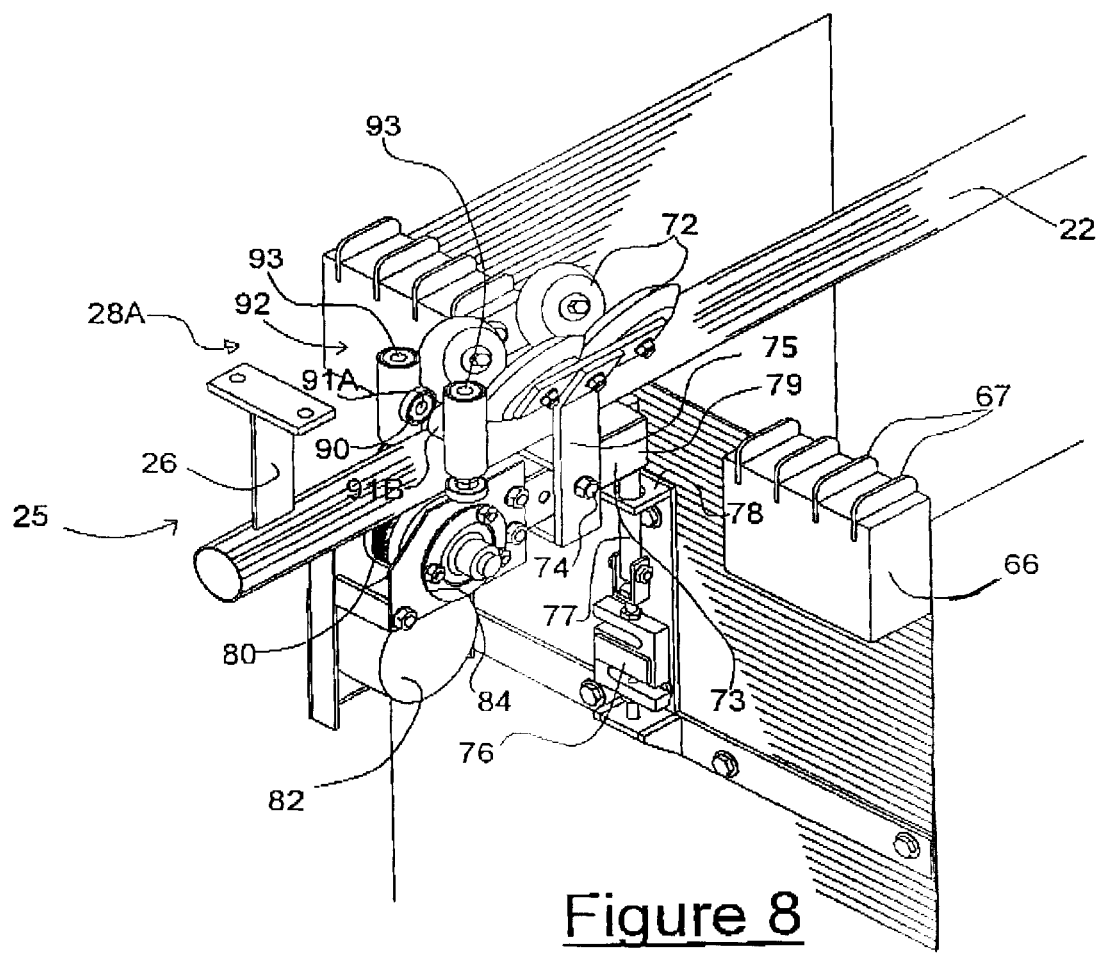
FIG. 8 is an enlarged view of a portion of the mobile feeder of FIG. 2.

Referring to FIGS. 2 and 8, mobile feeder 20 is suspended from track 22 by a pair of suspension assemblies, 28A and 28B. Each suspension assembly comprises a carriage which includes a U-shaped bracket 75 which carries carriage wheels 72. Wheels 72 ride on the upper surface of track 22. Preferably, carriage wheels 72 are angled outwardly as shown. Carriage wheels 72 are positioned so that they can pass on either side of supports 26 when mobile feeder 20 moves along track 22. In the preferred embodiment, the portion of mobile feeder 20 which carries feed compartments 30 is suspended from suspension assemblies 28 by a coupling which includes a weighing mechanism 76 which may comprise, for example, a load cell. In the illustrated embodiment, the couplings include a member 77 which passes through an aperture 78 and attaches to weighing mechanism 76 by way of a pivotal coupling 79. This prevents side loads from being applied to weighing mechanism 76.

Drive means 25 may comprise a drive wheel 80 which frictionally engages track 22. Drive wheel 80 is driven by a computer-controlled motor 82 either directly or through a mechanical transmission 84. Transmission 84 may comprise a suitable positive drive such as a chain drive, a non-slip belt drive or a gear drive. Motor 82 is preferably a stepper motor or a servo motor. Transmission 84 preferably acts as a step-down transmission. The ratio of transmission 84 should be such that the top speed of mobile feeder 20 along track 22 is reasonably high.

Drive wheel 80 is biased against the underside of track 22 by a bias means comprising a support beam 73. Support beam 73 is pivotally coupled to first suspension assembly 28A for pivoting about a pivot axis 74. Drive wheel 80 is coupled to support beam 73 on a first side of pivot axis 74 and the bulk of feeder unit 20 is suspended from support beam 73 on a second, opposed, side of pivot axis 74. The effect of this configuration is that the weight of the mobile feeder creates a downward force on one end of support beam 73 which results in an upward force being exerted on drive wheel 80 at the opposite end of support beam 73. The upward force acts to keep drive wheel 80 pressed against overhead track 22. The force with which wheel 80 is pressed against track 22 thereby increases with the weight of feed being carried in feed unit 20. The force with which drive wheel 80 is pressed against track 22 can be varied by moving the location of pivot axis 74 relative to support beam 73.

Figure 16:
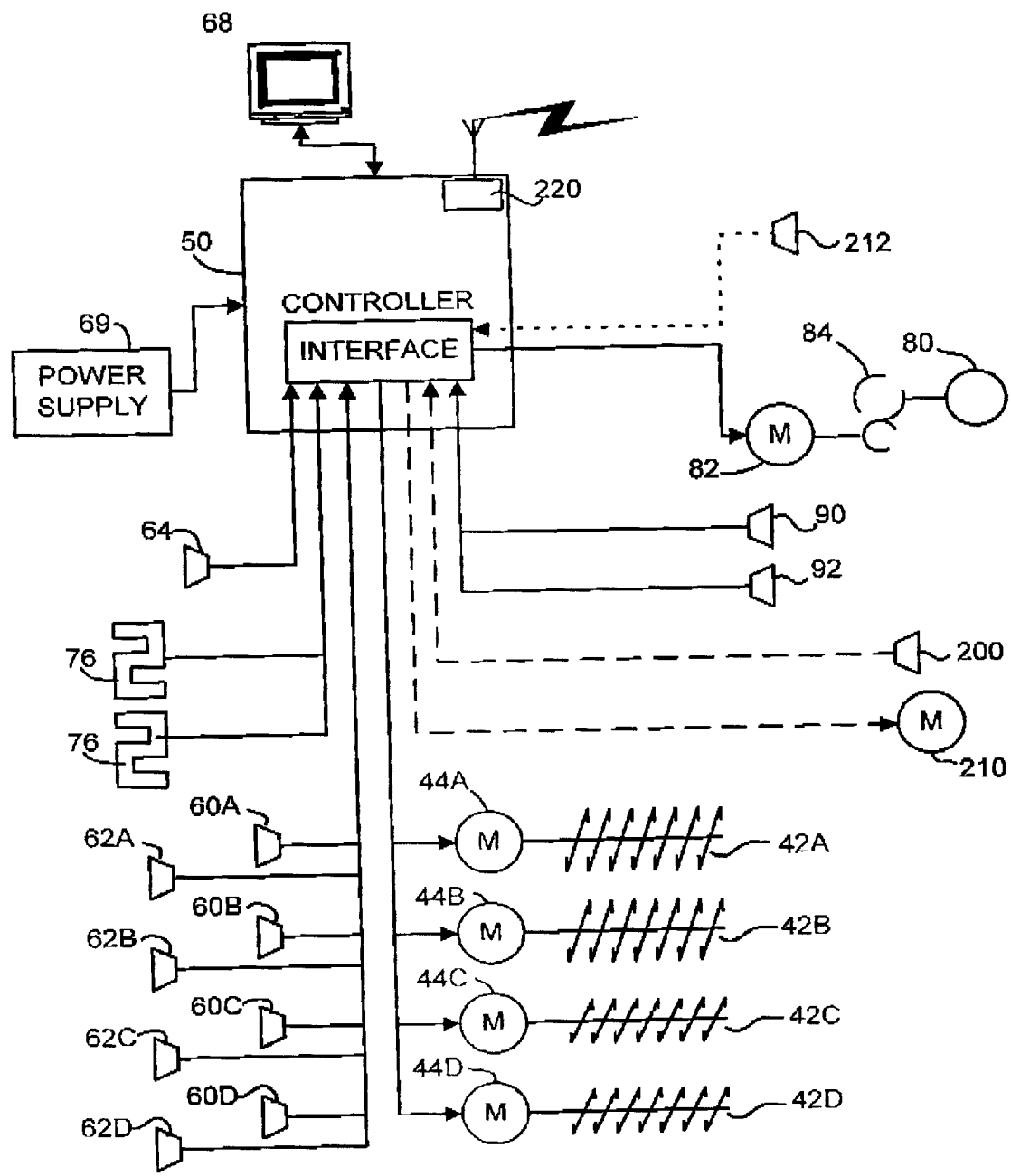
FIG. 16 is a schematic view showing a control system for one embodiment of the invention.
Figure 17:
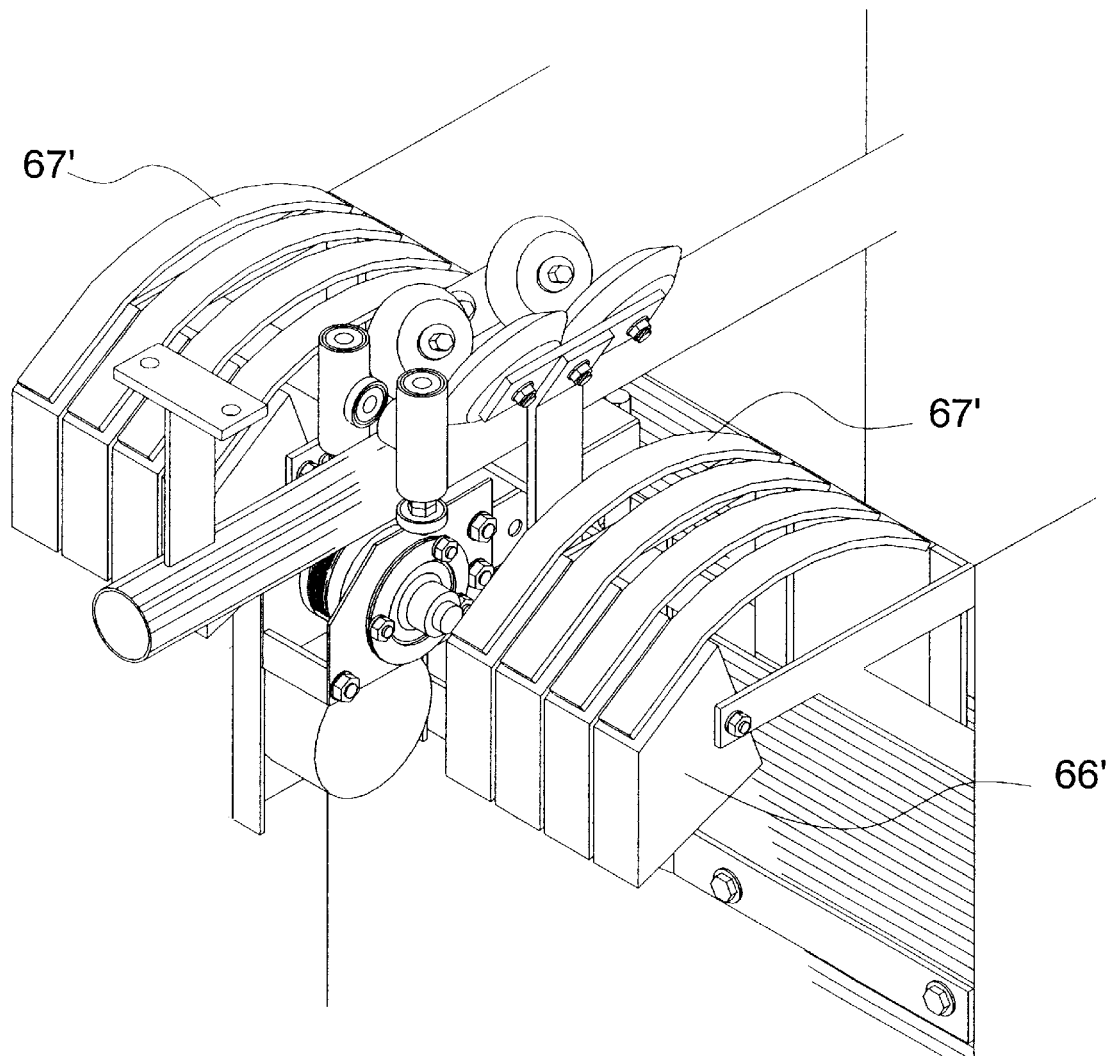
FIG. 17 is an isometric view showing the charger connection of FIG. 4B.
Figure 18:
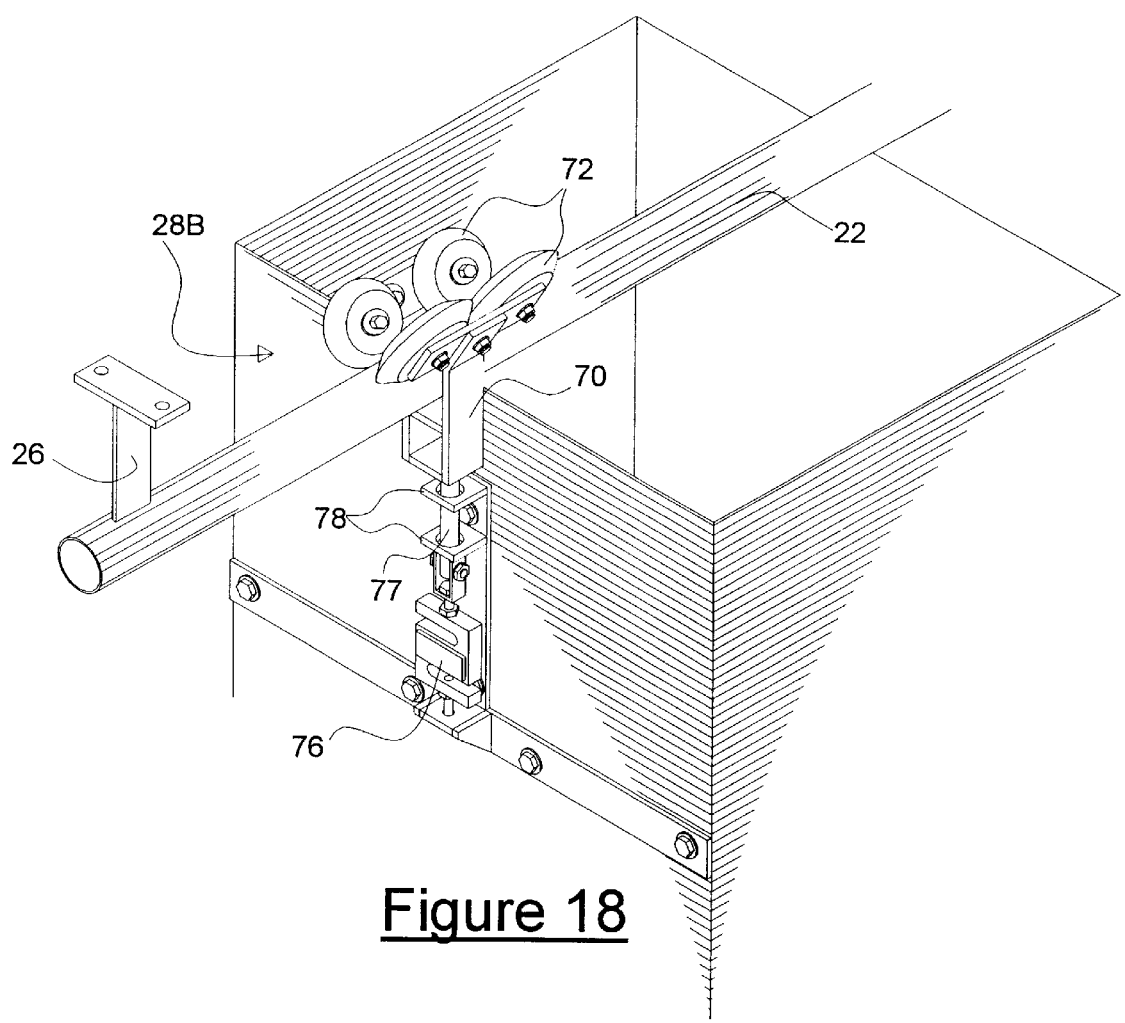
FIG. 18 is a partial isometric view of the mobile feeder of FIG. 9 front the end opposite to the driving means.

Mobile feeder 20 comprises a control system 50. In the illustrated embodiment, control system 50 comprises a computer running control software. The computer is connected to a number of sensors by way of suitable interfaces. The interfaces may be provided, for example on interface cards used in conjunction with suitable interface software. Suitable interface cards and software are commercially available. As shown in FIG. 16, control system 50 is also connected to control the operation of each of motors 44 and drive motor 82. In the illustrated embodiment, controller 50 is housed in compartment 65. A touch screen monitor 68 is provided to permit a user to view information about the status of feeder unit 20 and to input commands to guide the operation of feeder unit 20. For example, information related to feed blends and feed amounts to be delivered at specific drop locations 24, the locations of drop locations 24, and the sequence and frequency of feeding may be entered into controller 50 by way of touch screen 68. Any suitable user interface device, such as a keypad, keyboard, or the like may be provided in place of touch screen 68.

In preferred embodiments of the invention, controller 50 comprises a wireless networking card 220 (FIG. 16). Controller 50 can receive by way of the wireless networking card instructions regarding the blend and amount of feed to deliver at various feed drops and can transmit to a herd management system information regarding the amount of feed deposited at each feed drop and the status of mobile feeder 20. This permits a farmer to control and monitor mobile feeder 20 from an office or other remote station.

Figure 5A:
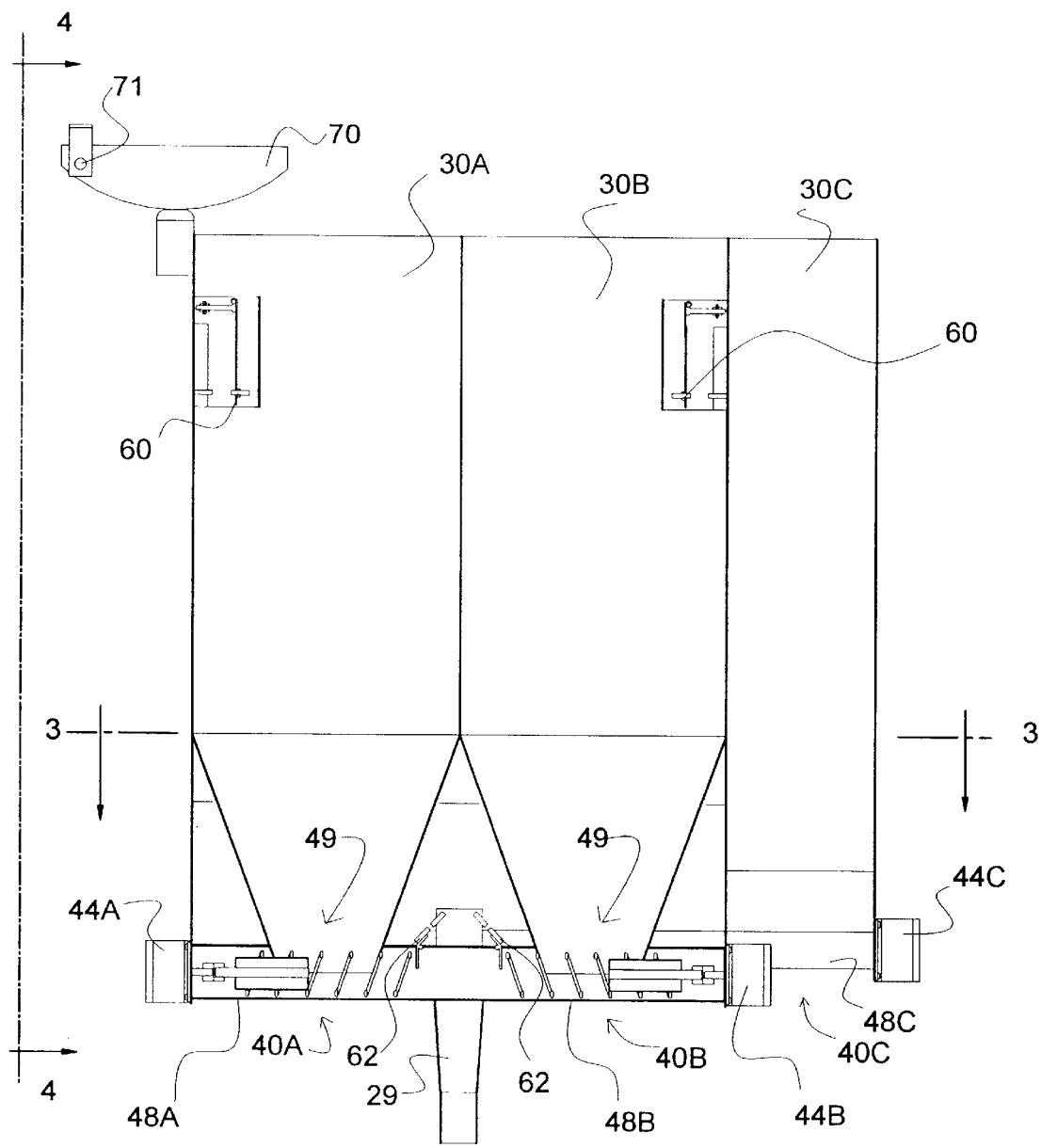
FIG. 5A is a longitudinal cross-section of the mobile feeder on the line 5—5 of FIG. 3.

In the preferred embodiment of the invention, each feed compartment 30 comprises one or more level sensors 60 (FIGS. 2 and 5). Level sensors 60 provide a signal to controller 50 when the feed compartment 30 in which the level-detecting switch is located has been filled to a certain level. Level sensors 60 may, for example, each comprise a pivotally mounted panel. When the associated compartment 30 is full, feed in the compartment pushes the panel into a position in which a set of electrical contacts close (or open). In the alternative, level sensors 60 could comprise other types of sensors such as proximity switches or ultrasonic, optical, or electromagnetic sensors.

Preferably each feed compartment 30 includes at least one level sensor 60 located to generate a signal when the compartment is full and one empty sensor 62 which generates a signal when the compartment and the associated dispensing means are empty of the feed ingredient. Empty sensor 62 may comprise a paddle 62A which is normally held in an elevated position by the presence of feed in the associated dispensing means. When the feed runs out, paddle 62A drops to a lowered position. A signal indicating that paddle 62A has dropped to the lowered position is transmitted to controller 50 to indicate that the associated compartment 30 is empty. Empty sensor 62 may, for example, comprise a magnet 62B which is coupled to and moves with paddle 62A and a magnetic switch 62C which changes state depending upon whether paddle 62A is in its elevated position or its lowered position. Empty sensor 62 may also comprise any other type of sensor capable of detecting an absence of feed in a dispensing means 40.

Preferably, feed apparatus 20 comprises a full sensor 64 which sends a signal to controller 50 when a feed drop is full. In the currently preferred embodiment of the invention, full sensor 64 comprises a switch which changes state when feed has backed up into discharge chute 29. Full sensor 64 may be used to determine precisely how much feed has been consumed at a particular feed drop since the feed drop was last filled by mobile feeder 20. This information can be used, in turn, to fine tune the ration being provided to animals at that feed drop. The provision of a full sensor 64 also permits the detection of problems such as a particular feed drop 24 becoming blocked.

Mobile feeder 20 also includes sensors which provide information to controller 50 regarding the location of mobile feeder 20 along track 22. In the illustrated embodiment of the invention mobile feeder 20 comprises a support sensor 90 which detects when mobile feeder 20 is at one of the supports 26 which holds up track 22. In the preferred embodiment of the invention (see FIG. 8), sensor 90 comprises a magnetic sensor which detects a disruption in a magnetic field of a magnet 91A caused by the interposition of a steel support 26 between magnet 91A and a magnetic field detector 91B. In the alternative, sensor 90 could comprise a proximity switch, a mechanical switch actuated by a lever which contacts supports 26, a photo sensors, or the like.

Mobile feeder 20 preferably also comprises a reference position sensor 92. Reference position sensor 92 detects markers placed at reference positions, such as the positions of feed drops 24, refilling stations 23A or recharging stations 23B. In the illustrated embodiment, reference position sensor 92 comprises a number of magnetic sensors 93 on suspension assembly 28A. Magnetic sensors 93 generate signals which indicate to controller 50 when they are close to magnets (not shown) mounted above track 22. Reference position sensor 92 is not necessarily a magnetic sensor and may comprise any other type of sensor capable of signaling to controller 50 when mobile feeder 20 is in a desired position.

Preferably controller 50 maintains a map of all significant locations along track 22. The map may comprise a data structure on a memory or other storage device accessible to controller 50. The map includes, for example, information which specifies locations of feed drops 24, filling stations 23A and recharging stations 23B. Preferably the map also includes information specifying the positions of supports 26.

Controller 50 is configured to cause feeder assembly 20 to travel to specific locations along track 22 and, while at those locations, to perform certain actions, such as unloading predetermined quantities of certain blends of feed or supplying a certain blend of feed until a feed drop at the location is full. In the preferred embodiment of the invention controller 50 maintains a record of its current location. Since motion of mobile feeder 20 is driven by motor 82 which is controlled by controller 50, controller 50 can update its current location by monitoring the number of revolutions that motor 82 has driven drive wheel 80. Where motor 82 is a stepper motor, this can be accomplished conveniently by counting the number of steps which motor 82 has made.

Drive roller 80 may slip slightly relative to track 22 so that, over time, the current location information maintained by controller 50 may become inaccurate. Controller 50 preferably monitors for signals from support sensor 90 and reference position sensor 92 and updates its current position information from the map when the signals indicate that mobile feeder 20 is passing a support 26 or passing a reference position. Controller 50 computes how many revolutions of drive wheel 80 (or steps of motor 82) are required to travel from the current position, as indicated by the current position information, to the destination. Preferably controller 50 controls drive motor 82 so that mobile feeder 20 accelerates to a maximum speed and begins to decelerate before it reaches its destination. Controller 50 begins to slow motor 82 when the current position information indicates that mobile feeder 20 is within a short distance (for example 40 to 100 cm) of its destination. Controller 50 causes motor 82 to stop when mobile feeder 20 has reached its destination.

Figure 4A:
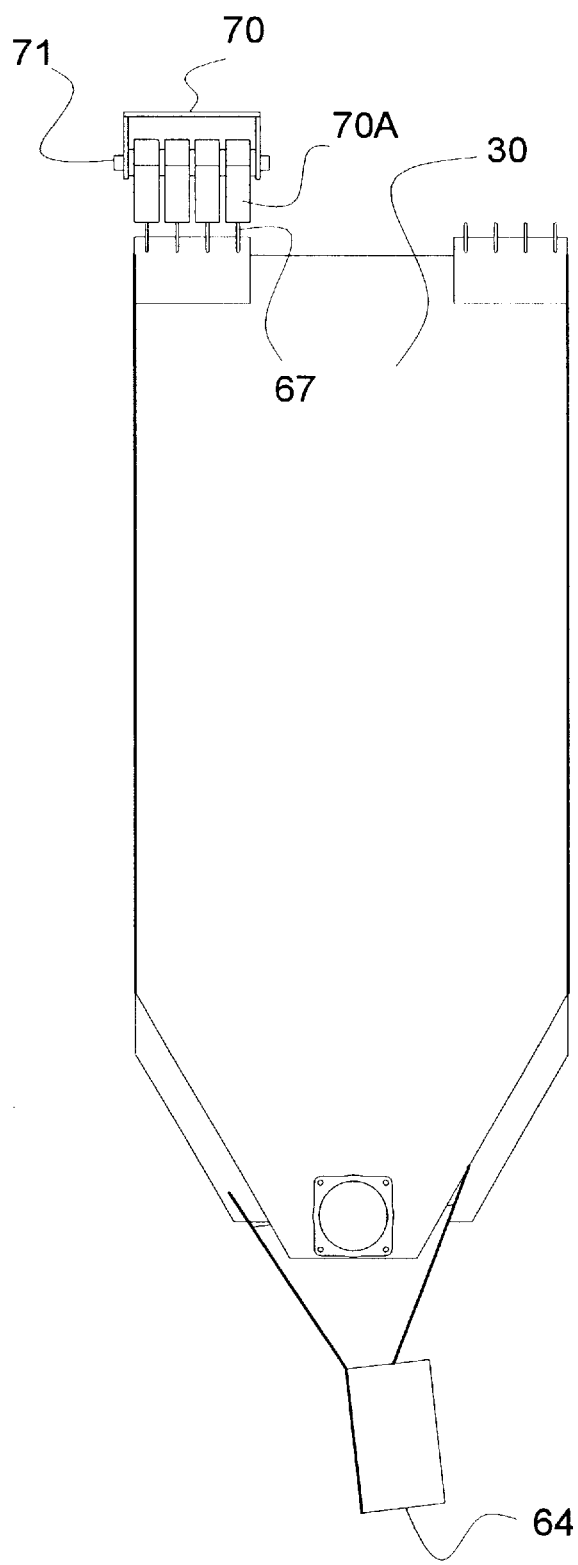
FIG. 4A is a transverse cross-section view through the mobile feeder on the line 4—4 of FIG. 5A.
Figure 4B:
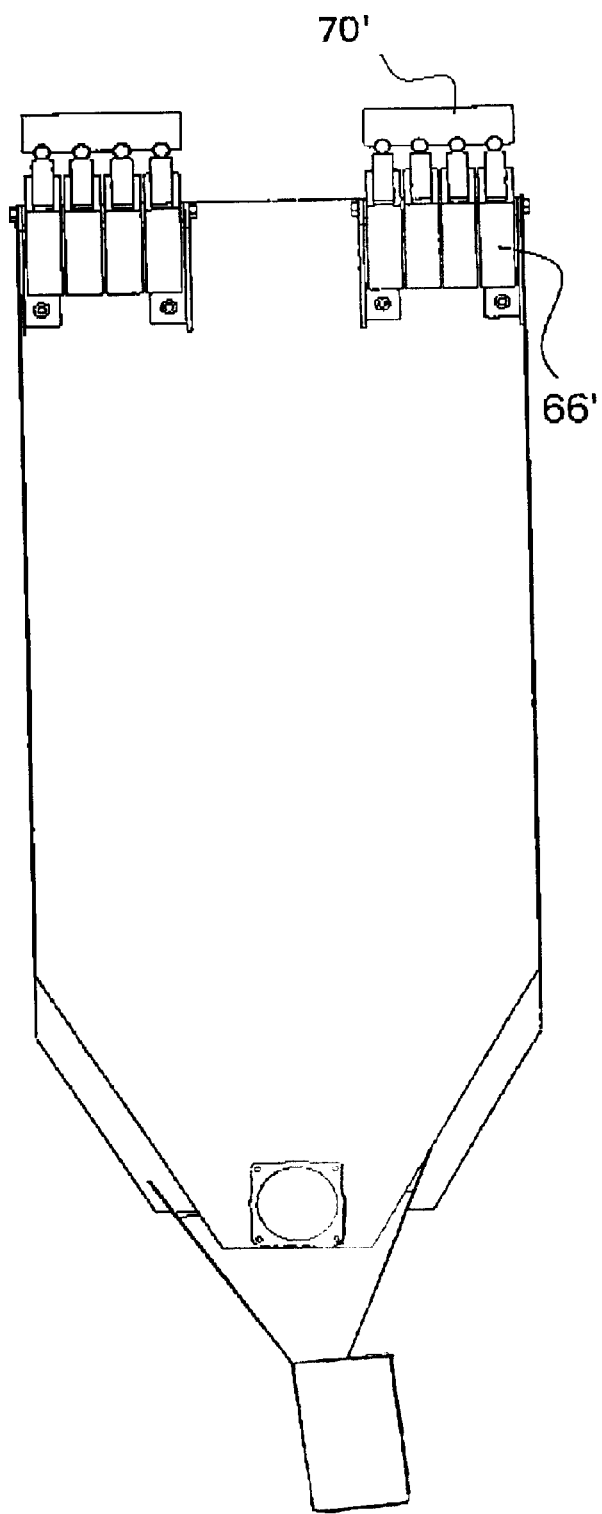
FIG. 4B is similar to FIG. 4A but shows an alternative connection for a charger.
Figure 5B:
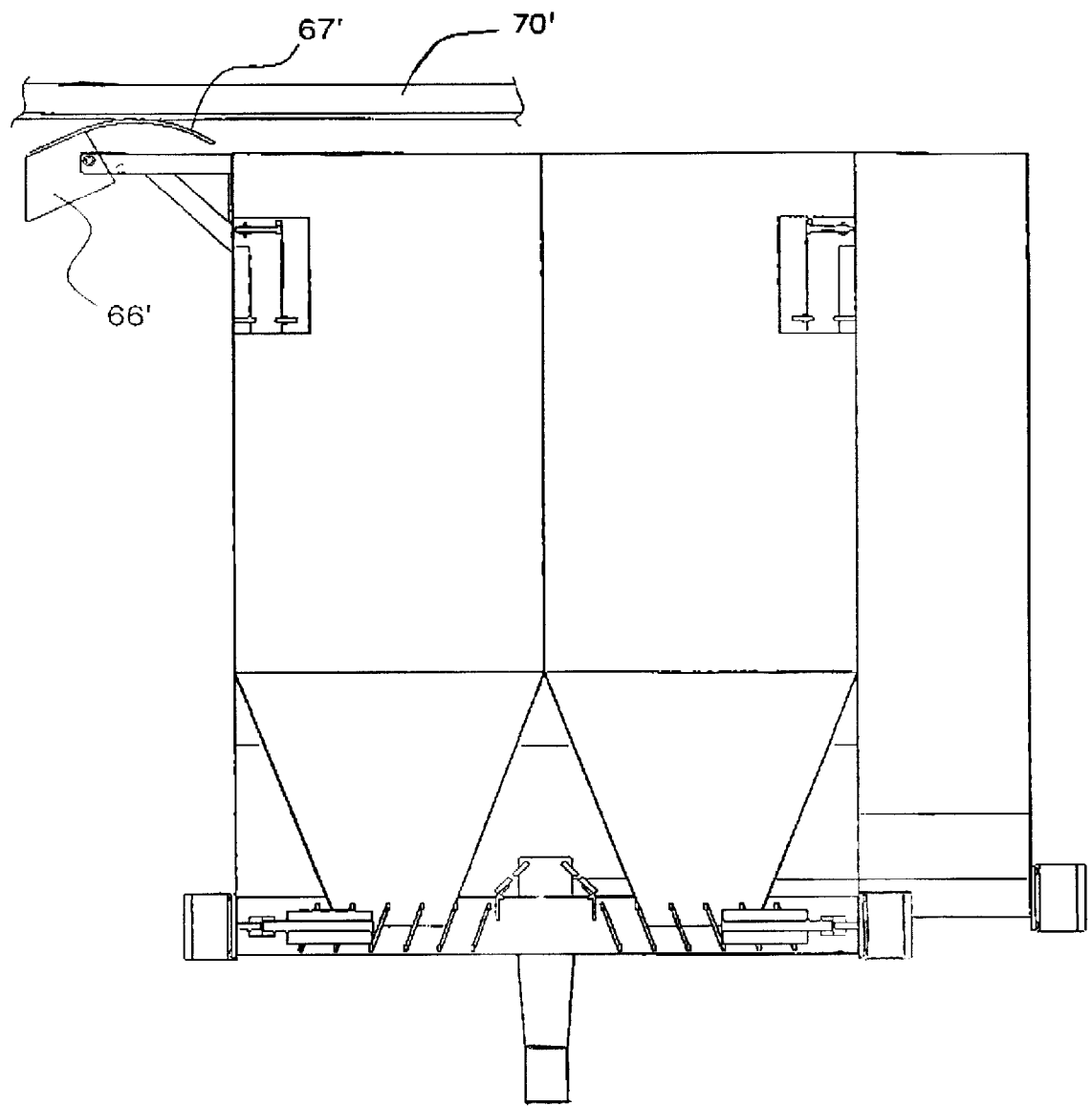
FIG. 5B is similar to FIG. 5A but shows an alternative connection for a charger.
Figure 6:
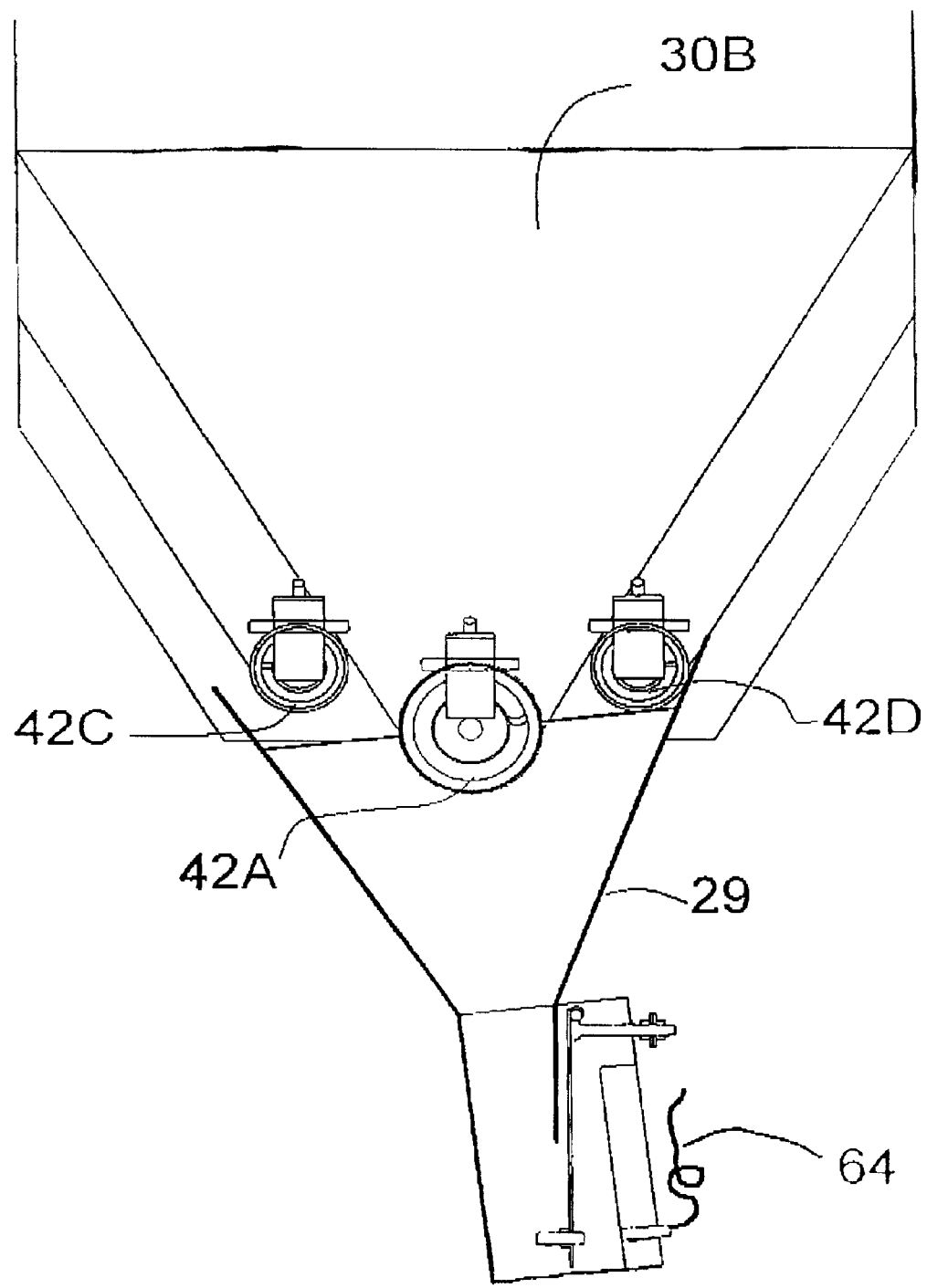
FIG. 6 is an enlarged sectional view of a portion of the mobile feeder of FIG. 3 taken on the line 6—6.
Figure 7:
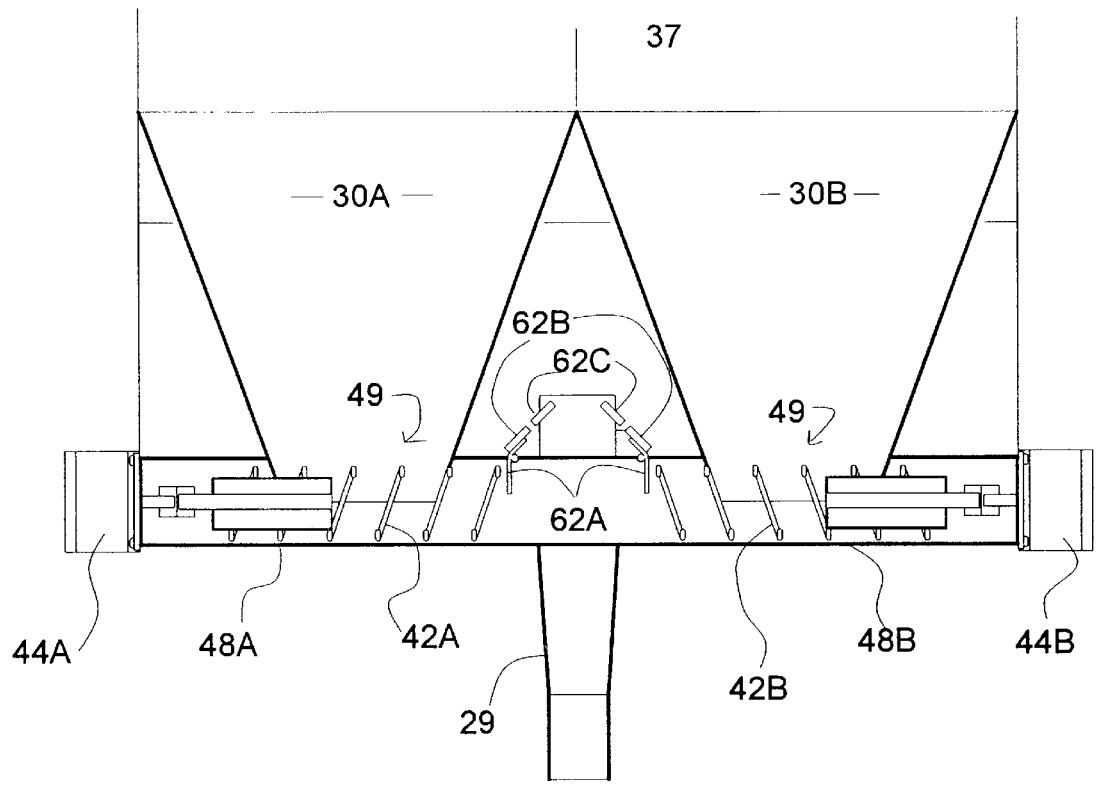
FIG. 7 is an enlarged view of a portion of the mobile feeder of FIG. 5.

Controller 50 may cause mobile feeder 20 to perform various actions when it has reached a destination. As shown in FIG. 4A, when mobile feeder 20 is stopped at a battery charging station 23B, electrical contacts 67 connect with electrical contacts 70A on a power connector 70 and batteries 69 are recharged by a charger (not shown). Power connector 70 may comprise a member having a curved lower face which is pivotally supported at a point 71. Power connector 70 can pivot to accommodate minor variations in the height of electrical contacts 67 on mobile feeder 20. The charger may comprise circuitry which prevents charging current from being applied until contact has been made between electrical contacts 67 and corresponding contacts 70A. This prevents sparking.

Figure 1B:
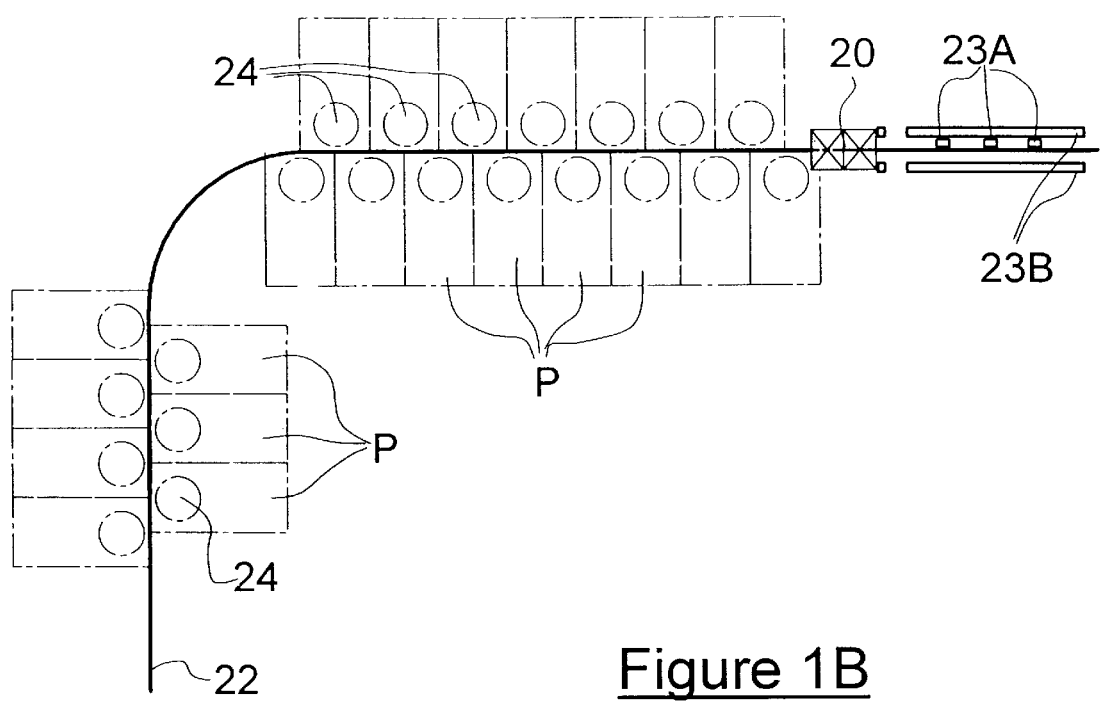

In an alternative embodiment of the invention shown in FIGS. 1B, 4B, 5B, and 17 mobile feeder comprises a movable power connector 66' which connects with a fixed power connector 70'. In a preferred embodiment, power connector 70' is located where the battery 69 of mobile feeder 20 can be recharged while mobile feeder 20 is being filled. As shown in FIG. 1B, the elongated power connector may extend above two or more filling stations 23A. This permits charging to take place throughout the time that mobile feeder 20 is being filled at the filling stations. Electrical contacts 67' on connector 66' are preferably resiliently biased into contact with the corresponding conductors or the fixed power connector 70'. In the illustrated embodiment, connector 66' is pivotally mounted to cart 20 at a location away from a center of gravity of connector 66' so that electrical contacts 67' are urged against fixed connector 70'.

Controller 50 monitors the state of charge of batteries 69. When the state of charge of batteries 69 falls to a value lower than a threshold then controller 50 may automatically cause mobile feeder 20 to travel along track 22 to a battery charging station 23B so that batteries 69 can be recharged.

At a filling station 23A mobile feeder 20 takes on more of a feed ingredient. Preferably a separate filling station is provided for each feed ingredient. Most preferably each filling station includes a sensor which detects when mobile feeder 20 is at the filling station, a source of a feed ingredient, an overhead chute which directs the feed ingredient into the appropriate one of feed compartments 30 and a control, which includes a timer, and can cause the feed ingredient to be is delivered via the overhead chute. The sensor may, for example, comprise a switch which is activated by a lobe on mobile feeder 20 when mobile feeder 20 is directly below the filling station 23A. The sensor may also be any other suitable sensor capable of signaling the presence of mobile feeder 20 at a filling station.

When mobile feeder 20 arrives at a filling station 23A its presence is detected by the filling station's sensor. The arrival of mobile feeder 20 causes the timer to begin measuring a time interval (for example, 15 seconds). If the time interval expires and mobile feeder is still at the filling station then the filling station's control causes the feed ingredient to be delivered to mobile feeder 20 by way of the overhead chute.

Controller 50 monitors the filling process. When controller 50 detects that the desired amount of the feed ingredient has been taken on, controller 50 causes mobile feeder 20 to move away from the filling station. When the filling station detects that mobile feeder 20 has started to move away it discontinues the supply of the feed ingredient.

As an alternative, controller 50 may control the filling process directly by communicating commands to a suitable controller at the filling station. The communication is preferably wireless. The communication may be implemented, for example, by providing a magnetic sensor connected to control the operation of the filling station and an electromagnet on mobile feeder 20 and controlled by controller 50. The electromagnet and magnetic sensor are close to one another when mobile feeder 20 is located to take on feed at the filling station. Controller 50 can energize the electromagnet to cause filling to commence and can turn off the electromagnet to cause filling to stop. The communication could also be implemented by way of a radio, ultrasonic or infrared transmitter controlled by controller 50 and a corresponding receiver connected to a controller which controls the filling station.

Controller 50 may be programmed to take on only a specific weight of the feed ingredient and may monitor signals from load cells 76 to determine when the desired weight of the feed ingredient has been taken on. Controller 50 may also monitor level sensors 60 to determine whether the compartment 30 which is being filled has been filled to a desired level. An advantage of using load cells 76 to accurately measure the amount of feed taken on by mobile feeder 20 is that feed compartments 50 can each be accurately filled with the needed amount of a feed ingredient. After all of the feed has been dispensed then mobile feeder will be empty or nearly empty. This saves the time that would otherwise be taken waiting for a particular compartment 30 to become emptied of one ingredient to permit it to be filled with another ingredient.

Figure 10:
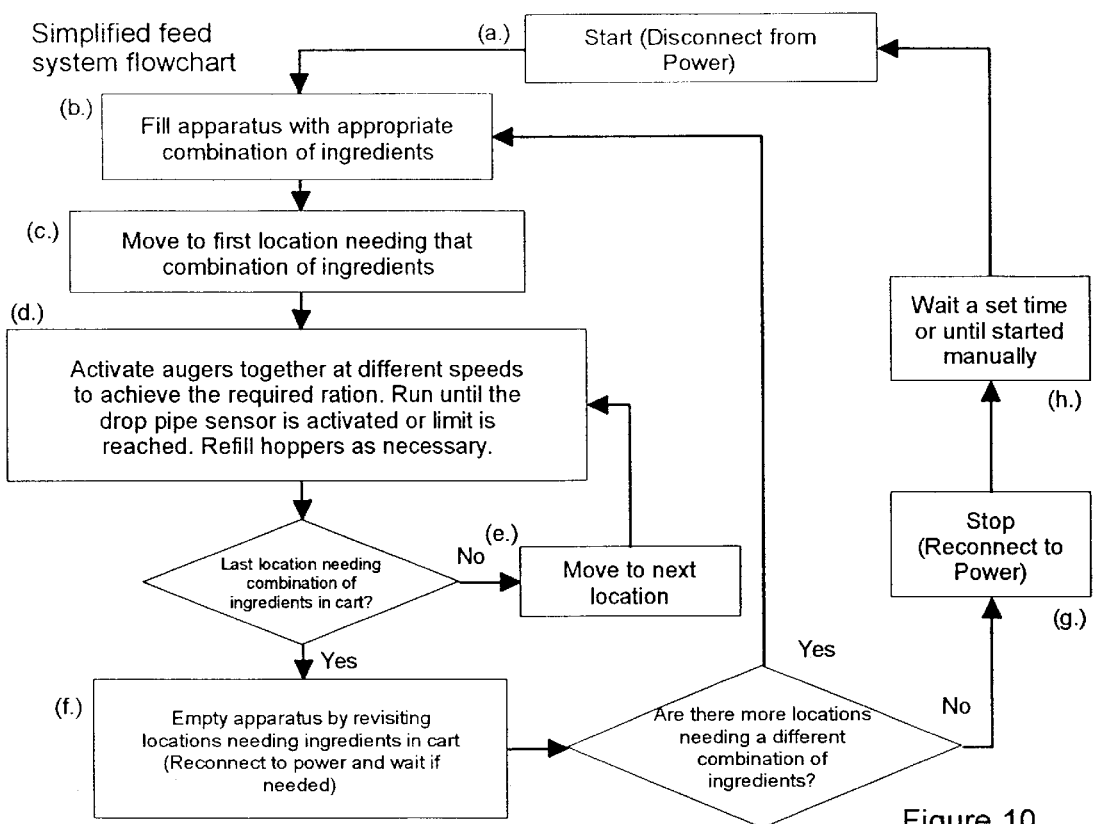
FIG. 10 is a simplified flowchart showing the operation of a feeder system according to the invention.
Figure 11:
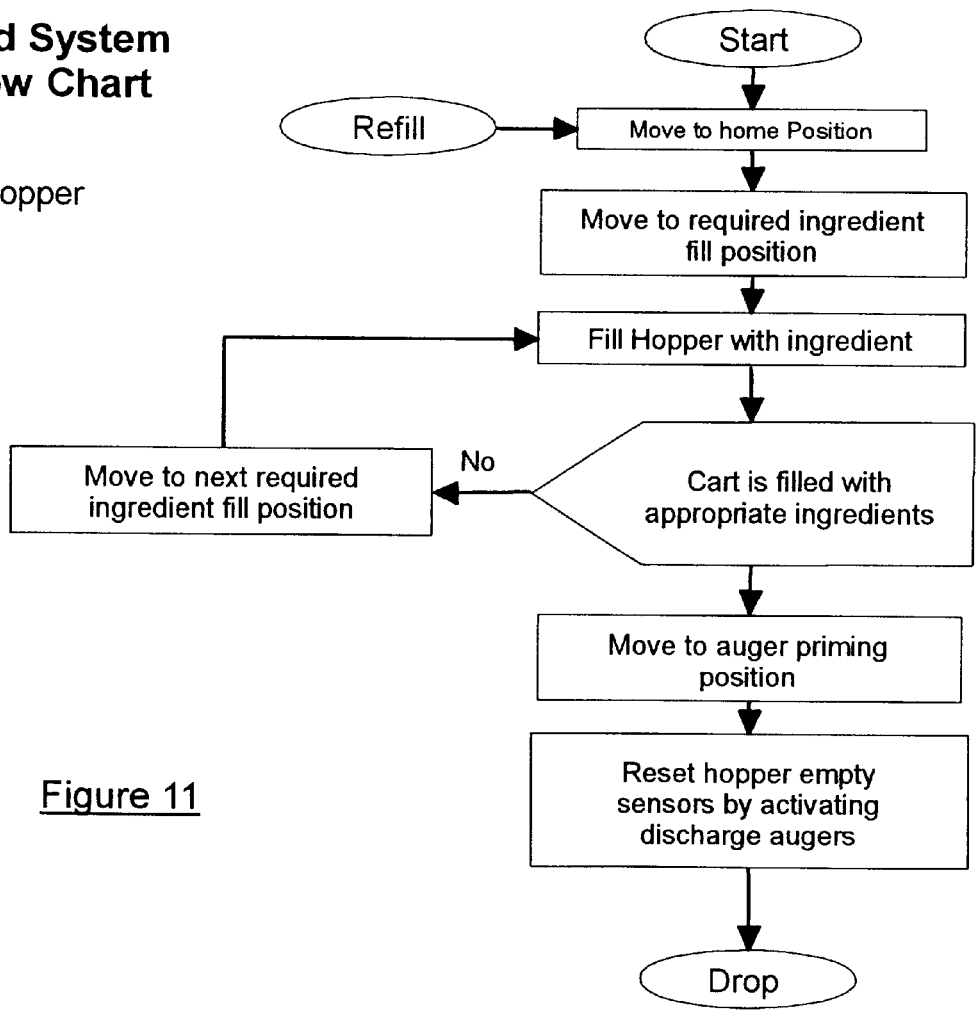
FIG. 11 is a flowchart showing a filling cycle of a feeder system according to the invention.
Figure 12:
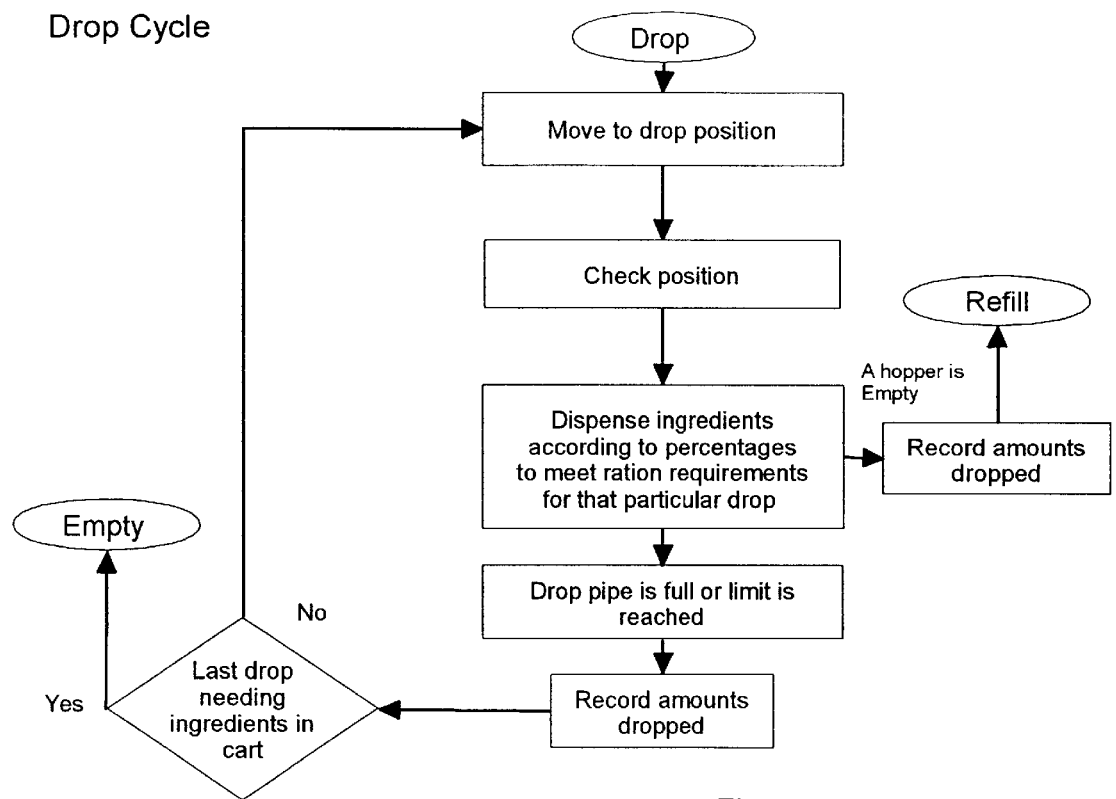
FIG. 12 is a flowchart showing a drop cycle of a feeder system according to the invention.
Figure 13:
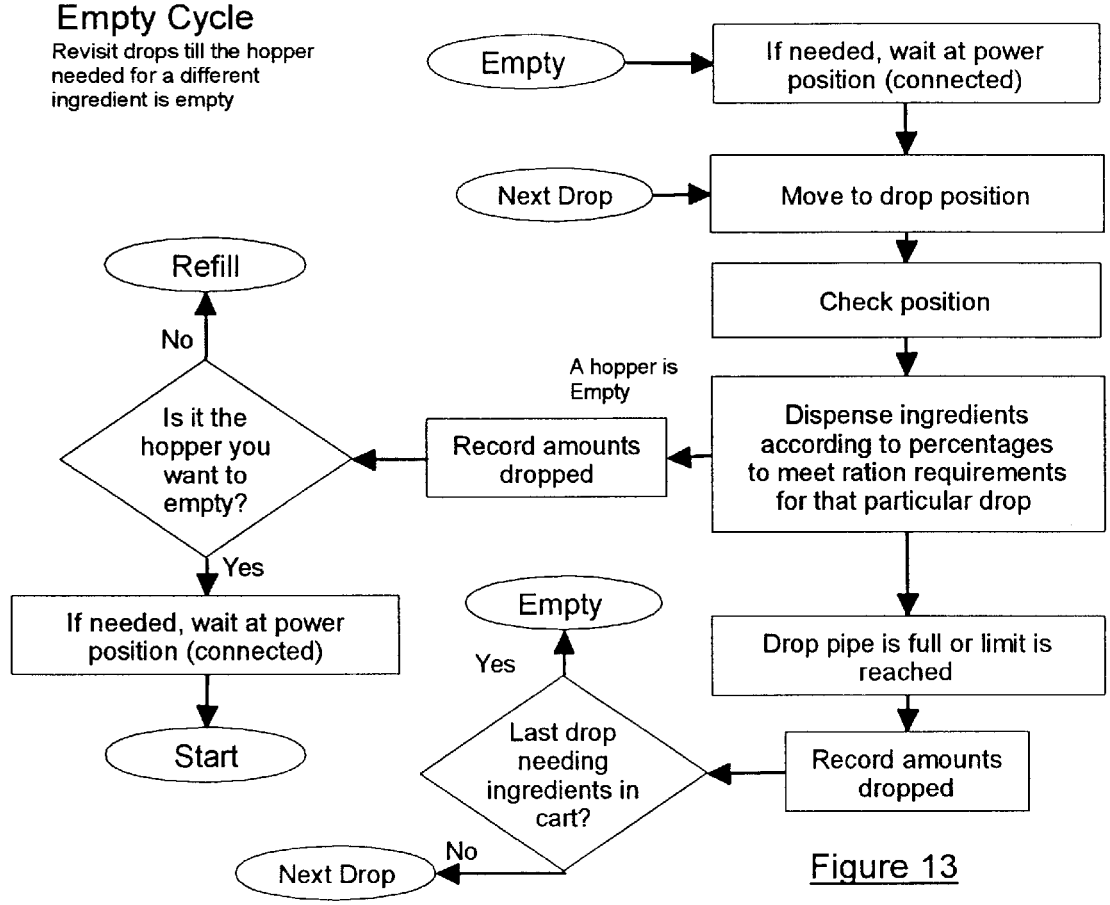
FIG. 13 is a flowchart showing an empty cycle for a feeder system according to the invention.

FIG. 10 illustrates steps which may be followed in the overall operation of mobile feeder 20. FIGS. 11, 12 and 13 show aspects of this method in more detail. FIG. 11 is a flowchart which outlines a sequence of steps for filling mobile feeder 20 with one or more needed feed ingredients. Mobile feeder 20 begins in a start or "home" position, which is generally at a recharging station 23B. If any of feed compartments 30 is not filled to a desired level or empty then controller 50 causes mobile feeder 20 to move to the filling station 23A which dispenses the feed ingredient corresponding to a first one of the feed compartments 30 which requires filling.

After the required amount of the first feed ingredient has been taken on then controller 50 causes mobile feeder 20 to move to the filling station 23A for the next feed ingredient. This continues until each of feed compartments 30 holds a desired amount of its feed ingredient. After the compartments have been filled, controller 50 causes mobile feeder 20 to move to a dispensing means priming location. At the priming location controller 50 resets each empty switch 62 (FIG. 5) by activating the corresponding dispensing means for a short period of time to fill the dispensing means with feed and thereby reset empty switches 62. Any feed which drops out of chute 29 during priming can be collected.

After mobile feeder 20 has taken on the required amount of each feed ingredient then it proceeds to a first drop location 24. FIG. 12 illustrates steps which may be followed in dispensing feed at each drop location 24. Controller 50 has access to information regarding a blend of feed ingredients to be delivered at each drop location. Controller 50 may also have access to information specifying an amount of blended feed to be dispensed at each drop location 24. Position sensor 92 confirms that mobile feeder 20 is at the drop location.

Controller 50 then activates the dispensing means for each of the ingredients included in the feed blend for that drop location 24. Controller 50 adjusts the relative rates at which the feed ingredients are dispensed so that a blend of the desired composition of ingredients is delivered through discharge chute 29. Each of the ingredients is dispensed at least substantially continuously during the same dispensing period. For example, if a feed blend should have a composition in which the ratio of three ingredients is 34:11:55, controller 50 controls motors 44 so that the dispensing means for the first ingredient delivers the ingredient at a first rate, the dispensing means for the second ingredient delivers the second ingredient at a second rate and the dispensing means for the third ingredients delivers the third ingredient at a third rate with the first, second and third rates related by the same ratio 34:11:55. Where motors 44 are stepper motors, this can be accomplished by stepping each of the motors 44 at a rate which drives the dispensing of the first ingredient at a first rate and drives the motors 44 for the second and third ingredients at step rates which deliver the second ingredient at 11/34 of the first rate and deliver the third ingredient at 55/34 of the first rate. The actual step rates will depend upon the amount of each ingredient dispensed per step. This may vary depending upon factors such as the amount of rotation per step; the pitch and diameter of the auger delivering the ingredient in question and the density of the ingredient in question. After a desired amount of feed has been deposited at the first drop location then controller 50 causes mobile feeder 20 to move to the next drop location 24.

Controller 50 may dispense a predetermined amount of feed at a dispensing location by monitoring the amount dispensed by each dispensing means (for example, by counting steps applied to motors 44 if motors 44 are stepper motors). This may also be done by monitoring a decrease in weight of mobile feeder 20 as measured by load cells 76. In other cases, controller 50 may deposit feed at a feed drop location 24 until full switch 64 in discharge chute 29 is activated. This permits the amount of feed consumed at the feed drop since the last time the feed drop was filled to be recorded. These modes of operation can be mixed. Controller 50 may be programmed to dispense a predetermined amount of a first blend of feed at a first drop location and to then go to a second drop location and dispense a second blend of feed until a feeder at the second drop location is full.

The amounts of feed ingredients dispensed at each drop location are recorded by controller 50. This information is very valuable for properly formulating feed for the animal(s) at the drop location. The information can also be useful in identifying animals who may be ill or off their food for some other reason. If a feed compartment becomes empty while feed is being dispensed and a desired quantity of feed has not yet been dispensed at that feed drop then controller 50 can use the information to determine how much of the desired quantity of feed remains to be dispensed at the drop location.

This process continues until one of the feed compartments is emptied or all the required drop locations have been visited. If the latter is the case, the mobile feeder moves to battery recharging station 23B until the next feeding time. If the former is the case, empty switch 62 associated with the empty feed compartment will be activated and controller 50 causes mobile feeder to move moved to the appropriate filling stations 23A.

Occasionally it may be necessary to refill a feed compartment 30 which was originally filled with a first ingredient with a different feed ingredient. When this occurs it is necessary to empty the feed compartment 30. This may be done, as illustrated in FIG. 13, by dispensing feed at drop locations which require the first ingredient until the compartment 30 is empty. The compartment 30 can then be filled with a different ingredient. FIG. 13 illustrates one possible method for doing this. When controller 50 determines that a feed compartment 30 is empty, it checks to see whether the empty feed compartment 30 should be refilled with the same feed ingredient that it held or whether that compartment should be filled with a different feed ingredient instead. If the compartment 30 is scheduled to be filled with a different feed ingredient then controller 50 moves mobile feeder 20 to the filling station 23A for the different feed ingredient. Otherwise, controller 50 causes the empty feed compartment to be refilled with the same ingredient.

As shown in FIG. 16, a mobile feeder 20 may have one or more sensors 212 which detect environmental conditions such as temperature, humidity, ammonia concentration or the like. Controller 50 can monitor sensors 212 and maintain records of environmental conditions at various locations along track 22. This information can be ov value for detecting and warning of conditions which may be suboptimal for animal growth, or even dangerous.

The construction of the feeder system of this invention provides a number of advantages. A primary advantage is that the feeder dispenses blended feed and is very versatile in that it can readily dispense radically different feed blends at adjacent drop locations. Other advantages include:

When mobile feeder 20 is used in a mode in which it dispenses feed at a drop location 24 until the drop location 24 is full (as indicated by full switch 64 then the amount of feed consumed at that feed drop between feedings can be automatically monitored.

The use of a computer controlled motor 82 to drive the motion of mobile feeder 20 along track 22 permits mobile feeder 20 to have a faster maximum travel speed than would be practical if mobile feeder 20 merely ran until a sensor detected that it had arrived at its destination.

The provision of load cells 76 both permits accurately measured quantities of feed ingredients to be loaded but is also useful for calibrating the dispensing means. Calibration can be performed in various ways which all involve operating a dispensing means and determining how much of the corresponding feed ingredient is dispensed. For example, where a motor 44 comprises a stepper motor, calibration could involve operating the stepper motor for a large number of steps and then determining how much of the corresponding feed ingredient has been dispensed using load cells 76. The weight of feed ingredient dispensed per step can then be readily determined. Controller 50 preferably maintains separate calibration information for each dispensing means.

Calibration may also be performed by operating a dispensing means and then collecting and weighing the dispensed feed.

Mobile feeder 20 optionally comprises a detector 200 (FIG. 16) which can automatically read identification information carried in tags or implants on individual animals being fed. Where such a detector is present, a mobile feeder according to the invention may be used to deliver customized feed rations to individual animals which are free to move from place-to-place. For example, mobile feeder 20 may move along a bunk-type feeder. When the detector indicates to controller 50 that a particular animal is at the feeder adjacent to the discharge chute then controller 50 determines whether the animal required feeding and, if so, determines what amount and blend of feed should be fed to the animal. Then controller 50 operates the dispensing means to deliver the desired amount of the desired blend of feed to the animal. Controller 50 records the amount fed to each animal.

Mobile feeder 20 may optionally have various accessories which may be controlled by controller 50. For example a sprayer (not shown) mounted on mobile feeder 20 may be periodically caused by controller 50 to dispense a dust control agent as mobile feeder travels from place to place. FIG. 16 shows an actuator 210 for some accessory which is controlled by controller 50.

The invention is not limited to feeding indoor-kept animals. Mobile feeder 20 may be equipped with a lid and suitable seals to permit it to be operated outside. In outdoor applications it may be convenient to support track 22 from a tensioned cable.

Figure 14:
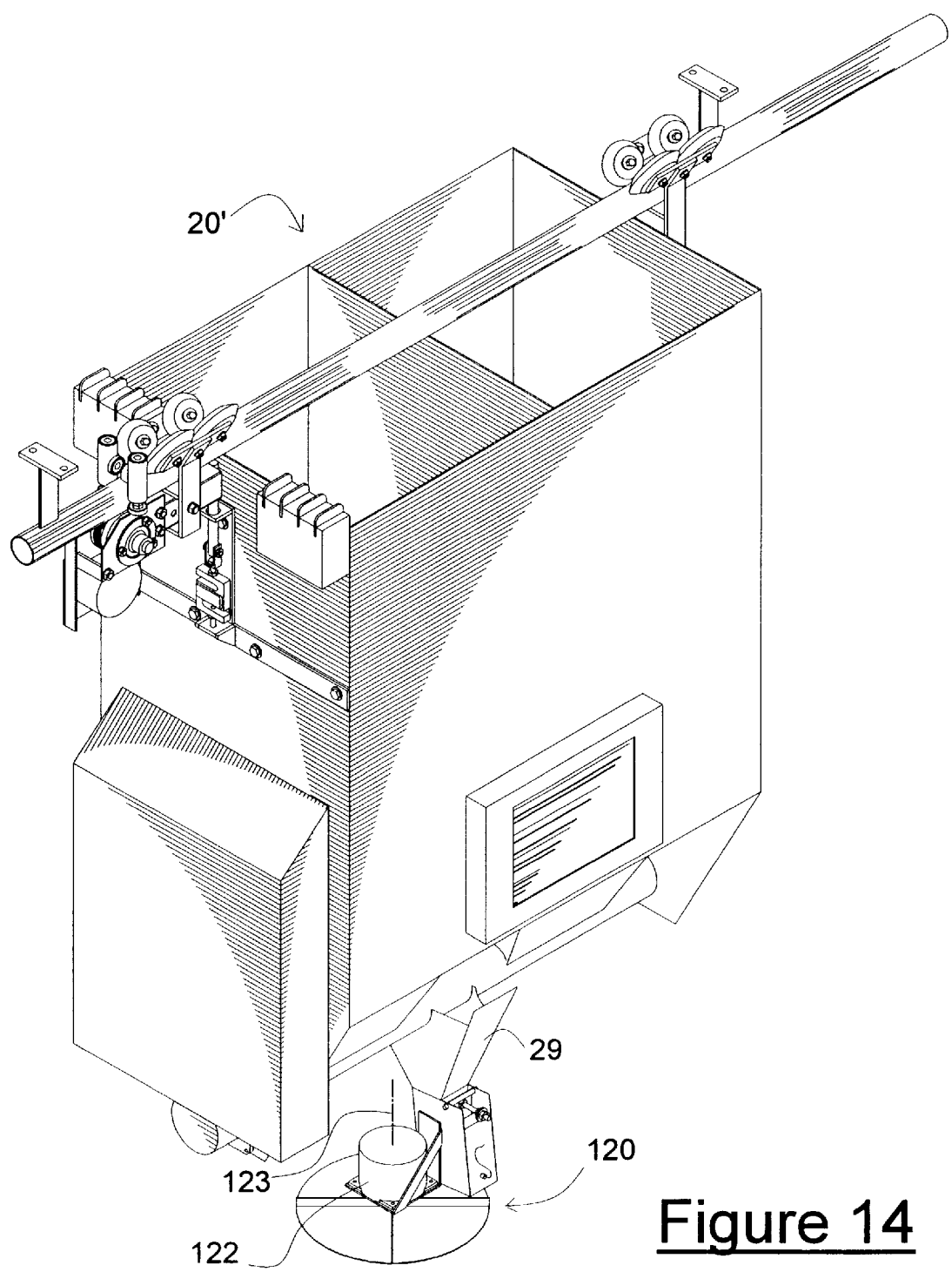
FIG. 14 is an isometric view of a fish feeder according to an alternative embodiment of the invention.
Figure 15:
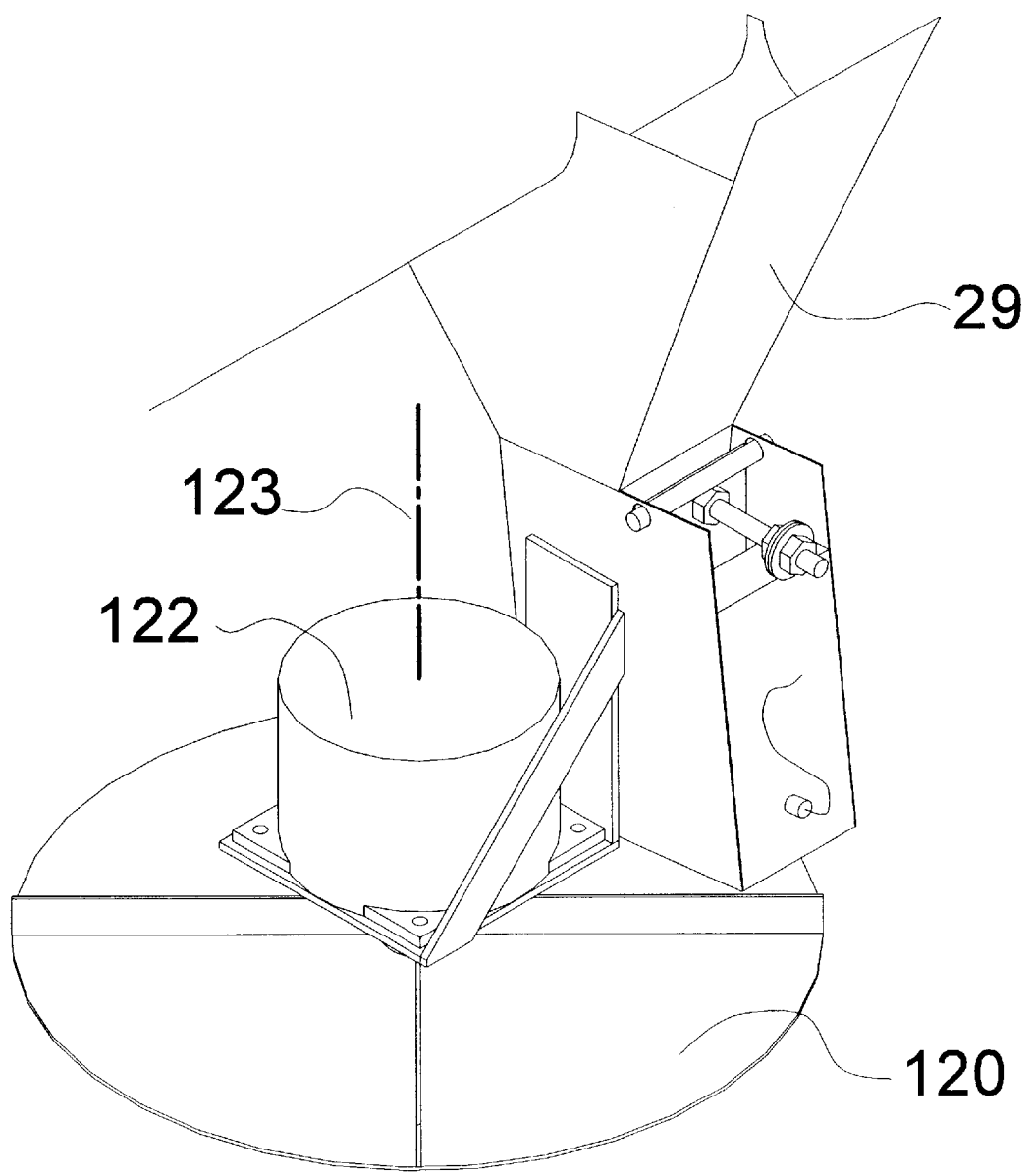
FIG. 15 is a detailed view of a spreader component of the fish feeder of FIG. 14.

FIG. 14 shows a mobile feeder 20' according to an alternative embodiment of the invention. Mobile feeder 20' is adapted for feeding fish. Farmed fish are typically reared in pens. The fish are fed periodically by broadcasting fish feed over the surface of the water in the pen. This is typically done manually. Mobile feeder 20' is substantially the same as the mobile feeder 20 described above with the exception that it includes a spreader 120 at the bottom of discharge chute 29. Spreader 120 is rotated about a substantially vertical axis 123 by a motor 122. Motor 122 may comprise a stepper motor, or any other motor capable of rotating spreader 120.

Mobile feeder 20' may be suspended from a track which extends over a number of fish pens. The track may comprise a tensioned cable (not shown). Mobile feeder 20' can be used by positioning it over a pen containing fish to be fed, rotating spreader 120 by energizing motor 122 and then discharging a desired blend of feed for the fish through chute 29 as described above. The discharged feed lands on the rotating spreader 120 and is broadcast over the surface of the water in the fish pen over which mobile feeder 20' is then located. Mobile feeder 20' may be configured to travel along the track on which it is mounted as the feed is broadcast.

As will be apparent to those skilled in the art in the light of the foregoing disclosure, many alterations and modifications are possible in the practice of this invention without departing from the spirit or scope thereof. For example:

While motors 44 described above as all being variable speed motors, it can be appreciated that it is the relative rate of discharge of the different feed ingredients being blended that is important. Therefore, if one of motors 44 is a constant speed motor then the invention can still be practiced by varying the speeds of the other motors 44.

While the above description describes each motor 44 as being capable of varying the rate at which each feed ingredient is deposited in chute 29 in an essentially stepless fashion, dispensing means having at least several discrete feed rates could also be used. As noted above, one of the dispensing means could have a fixed feed rate although it is better if all of the dispensing means have variable feed rates.

The dispensing means do not need to comprise motor-driven augers. The dispensing means may comprise other mechanisms capable of transferring a feed ingredient at a selected volumetric rate into chute 29. Dispensing means encompasses all suitable such devices.

In the embodiments described above, the guide means comprises an overhead track. The guide means could also comprise a track mounted to a side of feeder unit 20. For example the track could comprise a pair of parallel bars extending along a wall. The track could also comprise a track mounted under feeder unit 20. The illustrated embodiment is preferred because it keeps feeder unit 20 up and out of the way and is simple to implement.

The bias means may comprise a spring, or the like, for pressing drive wheel 80 against track 22 instead of, or in addition to a bias means which uses the weight of feeder unit 20 to generate a bias force.

Drive wheel 80 could be biased against a side surface of track 22 instead of a bottom surface of track 22.

Augers 42 can have diameters which are different from one another, as shown, or the same.

Mobile feeder 20 may comprise other devices such as a sprayer to keep dust down in the facility where mobile feeder 20 is being used. Controller 50 could periodically activate the sprayer while mobile feeder 20 is traveling along track 22. The sprayer may be built into mobile feeder 20 or may be in a train of one or more devices pulled along track 22 by mobile feeder 20.

Mobile feeder 20 may be suspended in a manner such that a single load cell can be used to monitor changes in its weight.

The controller may take any of many forms. The controller could comprise a general purpose computer running software, a specialized processor, a fixed purpose control circuit or a combination of one or more software-programmable processors with one or more fixed purpose control circuits.

A mobile feeder according to the invention may comprise a single hopper and a single dispensing device. While such a feeder would not permit feed to be blended it would allow the automatic depositing of feed at a number of feed drops. The feeder could be used to monitor the amount of feed consumed at each of a number of feed drops by providing a fill switch 64 in a discharge chute 29 of such a mobile feeder.

Although it is desirable, the discharge chute need not be fully enclosed. In embodiments of the invention which lack a fill switch 64 it is only necessary that the feed ingredients be discharged into a common discharge area so that they are intermixed as they are dispensed.

A feeder according to one aspect of the invention could have a single feed compartment; a discharge chute; a dispensing device associated with the feed compartment and adapted to deliver a feed ingredient from the feed compartment to the discharge chute; a motor connected to drive the dispensing device; a full switch located to detect when a feed drop being filled by the animal feeder system is full; and, a controller connected to operate the motor until the full switch indicates that the feed drop is full. Such a feeder would usefully permit the amount of feed consumed at a feeding station to be monitored.

Accordingly, the scope of the invention is to be construed in accordance with the substance defined by the following claims.

What is claimed is:

1. An animal feeder system comprising a mobile feeder, the mobile feeder comprising:

at least first and second feed compartments;

first and second dispensing devices respectively associated with the first and second feed compartments and adapted to deliver a feed ingredient from the associated feed compartment to a common discharge area;

a variable speed first motor connected to drive the first dispensing device;

a second motor connected to drive the second dispensing device; and, a controller connected to control the first and second motors, the controller configured to discharge a desired amount of animal feed comprising a selected blend of feed ingredients from the first and second feed compartments by way of the common discharge area by adjusting relative speeds of the first and second motors to have a desired ratio and operating the first and second motors while maintaining the relative speeds at the desired ratio until the desired amount of animal feed has been discharged.

2. The animal feeder system of claim 1 comprising a discharge chute wherein the first and second dispensing devices each deliver a feed ingredient into the discharge chute.

3. The animal feeder system of claim 2 comprising a full sensor connected to provide a full signal to the controller if feed backs up into the discharge chute wherein the controller is configured to discontinue operation of the dispensing devices upon receiving the full signal.

4. The animal feeder system of claim 2 comprising a feed spreader located to spread feed being discharged in the discharge chute.

5. The animal feeder system of claim 2 wherein the dispensing devices each comprise an auger and the first and second motors each comprise a computer-controlled variable speed motor.

6. The animal feeder system of claim 3 wherein the full sensor comprises a movable panel in the discharge chute, and a switch associated with the panel and configured to change state upon movement of the panel from a first position to a second position.

7. The animal feeder system of claim 3 wherein the controller is configured to record an amount of feed dispensed at each location.

8. The animal feeder system of claim 5 wherein the first and second motors each comprise a stepper motor.

9. The animal feeder system of claim 1 wherein the dispensing devices each comprise an auger and the first and second motors each comprise a computer-controlled variable speed motor.

10. The animal feeder system of claim 9 wherein the first and second motors each comprise a stepper motor.

11. The animal feeder system of claim 9 wherein the mobile feeder is suspended from an overhead track.

12. The animal feeder system of claim 11 comprising a computer-controlled drive motor coupled to turn a drive roller which is in frictional engagement with the track.

13. The animal feeder system of claim 12 wherein the computer-controlled drive motor comprises a stepper motor.

14. The animal feeder system of claim 12 wherein the mobile feeder comprises a suspension assembly which rides on the track, the drive roller is on a first end of a support beam which is pivotally attached to the suspension assembly between the first end of the support beam and a second end of the support beam, and the feed compartments are suspended from the second end of the support beam.

15. The animal feeder system of claim 14 wherein the track comprises a horizontally extending round pipe.

16. The animal feeder system of claim 1 comprising one or more load cells connected to generate a signal indicative of a total weight of feed ingredients in the first and second teed compartments.

17. The animal feeder system of claim 16 wherein the mobile feeder comprises two suspension assemblies each of which rides on an overhead track and the feed compartments are suspended from each of the two suspension assemblies by a member which includes a load cell.

18. The animal feeder system of claim 1 comprising one or more level sensors in each of the first and second feed compartments, wherein the controller has access to information specifying a location of a filling station corresponding to each of the feed compartments and, upon detecting that one of the feed compartments requires filling, the controller is configured to move the mobile feeder to the filling station corresponding to the feed compartment which requires filling and to remain at the filling station until the level sensors indicate that the feed compartment which required filling has received a desired amount of a feed ingredient.

19. The animal feeder system of claim 18 wherein the filling station comprises a control, a sensor which generates a mobile feeder present signal in response to the arrival of the mobile feeder at the filling station, a source of a feed ingredient, an overhead chute located to direct the feed ingredient into one of the feed compartments of the mobile feeder and a timer connected to be triggered by the mobile feeder present signal and reset whenever the mobile feeder present signal is interrupted, wherein the control is adapted to cause the feed ingredient to be delivered via the overhead chute after the timer indicates that the mobile feeder has been present at the filling station for at least a threshold time period.

20. An animal feeder according to claim 1 comprising one or more level sensors in each of the first and second feed compartments, wherein the controller has access to information specifying a location of a filling station corresponding to each of the feed compartments and, upon detecting that one of the feed compartments requires filling, the controller is configured to move the mobile feeder to the filling station corresponding to the feed compartment which requires filling and to remain at the filling station until a load cell determines that a desired weight of a feed ingredient has been taken on.

21. An animal feeder system comprising a mobile feeder, the mobile feeder comprising:
at least first and second feed compartments;
first and second dispensing devices respectively associated with the first and second feed compartments and adapted to deliver a feed ingredient from the associated feed compartment to a common discharge area;
a variable speed first motor connected to drive the first dispensing device;
a second motor connected to drive the second dispensing device; and,
a controller connected to control the first and second motors,
the controller adapted to cause animal feed comprising a selected blend of feed ingredients from the first and second feed compartments to be discharged by way of the common discharge area by adjusting relative speeds of the first and second motors;
a discharge chute wherein the first and second dispensing devices each deliver a feed ingredient into the discharge chute;
wherein the dispensing devices each comprise an auger, the first and second motors each comprise a computer-controlled variable speed motor, the mobile feeder is suspended from an overhead track and the mobile feeder comprises a computer-controlled drive motor coupled to turn a drive roller which is in frictional engagement with the track
wherein the overhead track is suspended by a plurality of supports, the mobile feeder comprises a sensor which detects the supports and generates a signal when the mobile feeder is adjacent one of the plurality of supports and the controller is connected to receive the signal, the controller maintaining current position information indicative of a current position of the mobile feeder along the track and map information specifying positions of the plurality of supports, the controller adapted to update the current position information from the map information when the signal indicates that the mobile feeder is at one of the supports.

22. An animal feeder system according to claim 21 wherein the second motor is a variable speed motor.

23. An animal feeder system comprising:
a feed compartment;
a discharge chute;
a dispensing device associated with the feed compartment and adapted to deliver a feed ingredient from the feed compartment to the discharge chute;
a motor connected to drive the dispensing device;
a full switch located to detect when a feed drop being filled by the animal feeder system is full; and,
a controller connected to operate the motor until the full switch indicates that the feed drop is full.

24. The animal feeder system of claim 23 wherein the full switch comprises a switch responsive to the presence of feed backed up in the discharge chute.

25. A method for delivering customized blends of animal feed at a plurality of locations, the method comprising:
providing a mobile feeder comprising a plurality of feed compartments each containing a different one of a plurality of animal feed ingredients;
moving the mobile feeder to a dispensing location;
obtaining a ratio of two or more specific animal feed ingredients in a selected blend of the two or more specific animal feed ingredients to be dispensed at the location;
simultaneously dispensing a desired quantity of the two or more specific feed ingredients by operating dispensing devices associated with the plurality of feed containers at controlled rates having a ratio selected to correspond with the ratio of the two or more specific feed ingredients to be dispensed at the location while maintaining the ratio of the controlled rates substantially constant; and, substantially simultaneously stopping the operation of the dispensing devices when the desired quantity has been dispensed.

26. A method for delivering customized blends of animal feed at a plurality of locations, the method comprising:

providing a mobile feeder comprising a plurality of feed compartments each containing a different one of a plurality of animal feed ingredients;

moving the mobile feeder to a dispensing location;

obtaining a ratio of two or more specific animal feed ingredients in a selected blend of the two or more specific animal feed ingredients to be dispensed at the location;

simultaneously dispensing a desired quantity of the two or more specific feed ingredients by operating dispensing devices associated with the plurality of feed containers at controlled rates having a ratio selected to correspond with the ratio of the two or more specific feed ingredients to be dispensed the location while maintaining the ratio of the controlled rates substantially constant; and, substantially simultaneously stopping the operation of the dispensing devices when the desired quantity has been dispensed wherein the mobile feeder is movable along a track supported by a plurality of track supports and moving the mobile feeder to a dispensing location comprises detecting and counting a plurality of the track supports.

27. The method of claim 26 wherein moving the mobile feeder to a dispensing location comprises detecting a marker at the dispensing location and stopping the mobile feeder adjacent to the marker.

28. A method according to claim 26 comprising determining that the desired quantity has been dispensed by detecting a signal from a full switch wherein the signal from the full switch triggers the stopping of the operation of the dispensing devices.

29. An animal feeder system comprising a mobile feeder, the mobile feeder comprising:

a plurality of feed compartments;

a plurality of dispensing devices, one of the dispensing devices respectively associated with each of the feed compartments and adapted to deliver a feed ingredient from the associated feed compartment to a common discharge area;

a plurality of motors including a motor connected to drive a first one of the dispensing devices and, for each dispensing device other than the first one of the dispensing devices, a corresponding variable speed motor connected to drive the corresponding dispensing device; and, a controller connected to control each of the plurality of motors, the controller configured to discharge by way of the common discharge area a desired amount of animal feed consisting of a selected blend of feed ingredients from the plurality of teed compartments by adjusting relative speeds of the plurality of motors to have desired ratios and operating the plurality of motors while maintaining the relative speeds at the desired ratios until the desired amount of animal feed has been discharged.

30. An animal feeder system according to claim 29 wherein the common discharge area comprises a discharge chute, the dispensing devices deliver feed ingredients directly into the discharge chute.

31. An animal feeder system according to claim 30 comprising a full sensor connected to provide a full signal to the controller if feed backs up into the discharge chute wherein the controller is configured to discontinue operation of the dispensing devices upon receiving the full signal.

32. A method for determining an amount of animal feed consumed by one or more animals, the method comprising:

providing a mobile feed dispenser at a dispensing location having a feed drop to be filled, operating the feed dispenser to dispense animal feed into the feed drop until a full sensor indicates that the feed drop is full;

subsequently, after an animal has consumed feed from the feed drop, moving the mobile feed dispenser to the dispensing location and then again operating the dispenser to dispense the animal feed, stopping the operation of the feed dispense devices when the full sensor indicates that the feed drop is full, and recording an amount of animal feed dispensed.

33. A method according to claim 32 wherein the mobile feed dispenser comprises a plurality of feed compartments each containing a different one of a plurality of animal feed ingredients.

34. A method according to claim 32 wherein dispensing the animal feed comprises obtaining a ratio of two or more specific animal feed ingredients in a selected blend of the two or more specific animal feed ingredients to be dispensed at the dispensing location;

and simultaneously dispensing a blend of the two or more specific feed ingredients into the feed drop by operating the dispensing devices associated with each of the plurality of feed containers at controlled rates having a ratio selected to correspond with the ratio of the two or more specific animal feed ingredients in the blend.

* * * * *